United States Patent [19]

Hasegawa et al.

[11] Patent Number: 5,247,587
[45] Date of Patent: Sep. 21, 1993

[54] PEAK DATA EXTRACTING DEVICE AND A ROTARY MOTION RECURRENCE FORMULA COMPUTING DEVICE

[75] Inventors: Hiroshi Hasegawa; Yasushi Okada; Jun Ishii; Taku Osada, all of Saitama; Shigeto Nakayama, Tokyo; Akira Nagao, Saitama, all of Japan

[73] Assignee: Honda Giken Kogyo Kabushiki Kaisha, Tokyo, Japan

[21] Appl. No.: 939,418

[22] Filed: Sep. 8, 1992

Related U.S. Application Data

[63] Continuation of Ser. No. 381,106, Jul. 17, 1989, abandoned.

[30] Foreign Application Priority Data

Jul. 15, 1988 [JP] Japan ............................. 63-176351
Jul. 22, 1988 [JP] Japan ............................. 63-183241

[51] Int. Cl.⁵ .................................................. G06K 9/20
[52] U.S. Cl. ........................................ 382/48; 382/18; 382/27
[58] Field of Search .................... 382/18, 27, 41, 48, 382/51, 50, 22, 103; 358/105

[56] References Cited

U.S. PATENT DOCUMENTS

| | | | |
|---|---|---|---|
| 3,069,654 | 12/1982 | Hough | 382/41 |
| 4,688,088 | 8/1987 | Hamazaki et al. | 382/18 |
| 4,741,046 | 4/1988 | Matsunawa et al. | 382/18 |
| 4,809,343 | 2/1989 | Wakabayashi et al. | 382/27 |
| 4,903,312 | 2/1990 | Sato | 382/18 |
| 4,910,787 | 3/1990 | Umeda et al. | 382/18 |
| 4,941,192 | 7/1990 | Mishima et al. | 382/18 |
| 4,969,198 | 11/1990 | Batchelder et al. | 382/27 |
| 4,969,202 | 11/1990 | Groezinger | 382/27 |
| 4,970,653 | 11/1990 | Kenue | 358/103 |
| 4,972,193 | 11/1990 | Rice | 382/18 |
| 5,008,950 | 4/1991 | Katayama et al. | 382/50 |
| 5,027,422 | 6/1991 | Peregrim et al. | 382/27 |

FOREIGN PATENT DOCUMENTS 52-127019 12/1984 Japan .

OTHER PUBLICATIONS

IBM Journal of Research and Development, vol. 27, No. 2, Mar. 1983, pp. 140-148, Armonk, N.Y., U.S.A.; G. Miranker et al.: A "Zero-Time" VLSI Sorter (Int'l Search Report).

1985 IEEE Computer Society Workshop on Computer Architecture for Pattern Analysis and Image Database Management, "CAPAIDM" etc.

*Primary Examiner*—Joseph Mancuso
*Attorney, Agent, or Firm*—Lyon & Lyon

[57] ABSTRACT

The first aspect of this invention relates to a peak data extracting device used in picture processing devices. The peak data extracting device comprises a DDA (data differential analysis) computing unit, an peak filter and a sorting unit. The computing unit gives Hough curves (sine curves) based on points to be processed on an original picture. The peak filter extracts peak data. The sorting unit sorts the peak data extracted with the noise components removed.

The second aspect of this invention relates to a rotary motion recurrence formula computing device which are used in the DDA computing unit. The device computes the rotary motion formula $$x_{i+1} = f_x(x_i, y_i, \epsilon)$$

$$y_{i+1} = f_y(x_i, y_i, \epsilon).$$

6 Claims, 35 Drawing Sheets

FIG. 9

|  | RELATIVE ERROR WITH RESPECT TO A DIAMETER | | | |
|---|---|---|---|---|
|  | $\epsilon = 2^{-3}$ | $\epsilon = 2^{-4}$ | $\epsilon = 2^{-5}$ | $\epsilon = 2^{-6}$ |
| FIRST ORDER APPROXIMATION | 11.2 | 5.3 | 2.6 | 1.3 |
| CONVENTIONAL DDA | 3.1 | 1.6 | 0.79 | 0.39 |
| FIRST EMBODIMENT | 0.42 | 0.11 | 0.026 | 0.0066 |
| SECOND EMBODIMENT | 0.31 | 0.076 | 0.018 | 0.0047 |

| SEQUENCE OF DATA | I | II | III | IV | V | VI | VII | VIII | IX | X |
|---|---|---|---|---|---|---|---|---|---|---|
| DATA VALUE | 5 | 7 | 2 | 8 | 4 | 9 | 3 | 1 | 6 | 8 |

PEAK DATA EXTRACTING DEVICE AND A ROTARY MOTION RECURRENCE FORMULA COMPUTING DEVICE

This is a continuation of co-pending application Ser. No. 381,106, filed Jul. 17, 1989, and now abandoned.

BACKGROUND OF THE ART

1. Technical Field of the Invention

This invention relates to a peak data extracting device and a rotary motion recurrence formula computing device which are used in picture processing devices using, e.g., Hough transform.

2. Related Background Art

In controlling an unmanned movable robot or an automatic movable vehicle, for example, the pictures of the lines marking off a lane, and those of the center line and the shoulder lines of a road have to be taken by a camera to be subjected to picture processing. FIG. 1(a) and (b) are views explaining recognition of a road by means of a picture. FIG. 1(a) shows a picture of a road taken by a camera. FIG. 1(b) is a view in which the picture elements in FIG. 1(a) having higher brightness (or higher brightness change ratios) are shown in black points.

As shown in FIG. 1(a), in a camera picture 1 a road 3 is extended at infinity toward a horizontal line 2. Shoulder lines 4 are on both sides of the road 3. A center line 5 is at the center of the rod 5. The shoulder lines 4 and the center line 5, of the road 3 have higher brightnesses than the other parts of the road 3 and are shown in continuous dots 4', 5' as shown in FIG. 1(b). Based on this camera picture 1, in order to recognize the direction and curves of the road 3, approximate straight lines $L_1$, $L_2$, $L_3$ interconnecting the dots 4' in FIG. 1(b) are recognized.

As a method for giving the approximate straight lines L, the method called Hough transform is conventionally known (e.g., specification of U.S. Pat. No. 3,069,654). Assuming that a point P ($x_p$, $y_p$) to be processed is present on an original picture drawn by the x-y coordinate system as shown in FIG. 2(a), an infinite number of straight lines l ($l_a$, $l_b$, . . . ) can be drawn. Straight lines passing the origin O (0,0) and orthogonal to the respective straight lines $l_a$, $l_b$, . . . can be also depicted. When a length of the straight lines l passing the origin O (0,0) to the straight lines l ($l_a$, $l_b$, . . . ) is represented by $\rho(\rho_a, \rho_b, \ldots)$ and an angle these straight lines form to the x axis is represented by $\theta(\theta_a, \theta_b, \ldots)$ the $\rho$ and $\theta$ of the straight lines passing the origin O (0,0) are given in the sine curve of FIG. 2(b), i.e., the Hough curve. The length $\rho_{max}$ between the origin O (0,0) and the point to be processed P ($x_p$, $y_p$) is the longest of the straight lines passing the point to be processed P ($x_p$, $y_p$). The length is given by $$\rho_{max}=(x_p^2+y_p^2)^{\frac{1}{2}}$$

and when $\theta=0$, $\rho_0=x_p$.

Next, Hough transform of FIG. 2(a) and (b) will be applied to three points $P_1 \sim P_3$ on a straight line L shown in FIG. 3(a). The sine curve (Hough curve) in the dot line in FIG. 3(b) is given with respect to the point $P_1$. The sine curve (Hough curve) with respect to the point $P_2$ is in the one dot line in FIG. 3(b), and that with respect to the point $P_3$ is in the two dot line in FIG. 3(b). The peaks ($\rho_1$, $\theta_1$), ($\rho_2$, $\theta_2$) and ($\rho_3$, $\theta_3$) of the respective sine curves of FIG. 3(b) correspond to the lengths $\rho_1 \sim \rho_3$ between the origin O (0,0) and the respective points $P_1$, $P_2$ and $P_3$ in FIG. 3(a), and the angles $\theta_1 \sim \theta_3$ the respective straight lines passing the origin O form to the X axis.

In FIG. 3(b), the point of intersection of the three Hough curves (sine curves) has coordinates ($\rho_t$, $\theta_t$) which are equal to $\rho_t$, $\theta_t$ of a straight line passing the origin O (0,0) and orthogonal to the straight line L. Thus by obtaining a point of intersection of such sine curves, an approximate straight line of the curves interconnecting the dots (dark points) in the x-y rectangular coordinate system of an original picture can be obtained (in FIGS. 3(a) and (b), however, the curves and the approximate straight line are in agreement).

This will be explained with reference to FIGS. 4(a) and (b). It is assumed that a number of dots (points to be processed) to be Hough transformed are on a curve in the x-y coordinate plane (original picture plane) in FIG. 4(a). In FIG. 4(a) three approximate straight lines $L_1$, $L_2$, $L_3$ interconnecting the dots can be depicted. When sine curves (Hough transform) are given with respect to all these dots, as in FIG. 2(b), three points of intersection of the sine curves are obtained. The three points of intersection have coordinates ($\rho_{t1}$, $\theta_{t1}$), ($\rho_{t2}$, $\theta_{t2}$), ($\rho_{t3}$, $\theta_{t3}$) in FIG. 4(a). When the occurrence of the point of intersection H is expressed by the $\rho$, $\theta$, H coordinate system, FIG. 4(b) is given. Accordingly, the approximate straight lines $L_1 \sim L_3$ of FIG. 1(b) corresponding to the shoulder lines 4 of the road 3 can be given in values of $\rho$ and $\theta$ at a peak of H (the occurrence of the point of intersection).

But, when a very large number of points to be processed are present in an original picture, a very large number of Hough curves are given corresponding to the points, and resultantly a very large number of intersecting points of the Hough curves are given. Since the intersecting points overlap in the $\rho$, $\theta$ plane, occurrence H of the points of intersection distributes, e.g., in FIG. 5. In FIG. 5, the first highest peak ($P_1$) indicates a maximum occurrence, and the occurrence H decreased in the order of peaks $P_3$, $P_4$ and $P_2$. But the second and third highest peaks $P_3$ and $P_4$ are near the first highest peak $P_1$ and thus is reduced to noise components in the picture processing. To the contrary, the peak $P_2$ has a lower peak value than the peaks $P_3$ and $P_4$, but in the picture processing the peak $P_2$ is a peak to be detected desirably next to the peak $P_1$. Unless the peak $P_2$ can be detected, the picture processing becomes very difficult as will be explained below.

As means for removing such noise components, it is considered to use software of a computer. But this makes the system large and needs a longer processing time.

A first object of this invention is to provide a peak data extracting device which can extract peak data with noise components removed, by a simple system and at high speed.

On the other hand, for the Hough transform mentioned above, there have been proposed processes which compute rotary motion recurrence formulas. In these processes, with reference to FIG. 6, a point $P_{i+1}$ ($x_{i+1}$, $y_{i+1}$) can be computed, based on a point $P_i(x_i, y_i)$ using Formula 5, 6 which is derived as follows. That is, in a rectangular x-y coordinate system, the point $P_{i+1}$ ($x_{i+1}$, $y_{i+1}$) to which the point $P_i$ ($x_i$, $y_i$) spaced by $\rho$ from the origin O(0,0) is rotated by $\epsilon$ (rad) with the origin centered is given as follows. That is, when $$x_i = \rho \cdot \cos \theta \quad (1)$$

$$y_i = \rho \cdot \sin \theta \quad (2)$$

$$x_{i+1} = \rho \cdot \cos(\theta + \epsilon) \quad (3)$$

$$y_{i+1} = \rho \cdot \sin(\theta + \epsilon) \quad (4)$$

Then Formulas 3 and 4 are expanded by the addition thereon, and the resulting equations are substituted by Formulas 3 and 4 to obtain the Formula 5, 6

$$x_{i+1} = \cos \epsilon \cdot x_i - \sin \epsilon \cdot y_i \quad (5)$$

$$y_{i+1} = \sin \epsilon \cdot x_i + \cos \epsilon \cdot y_i \quad (6)$$

But this computation includes the trigonometric function, which consequently not only makes it inconvenient to prepare the hardware but also makes the computation unsuitable for high speed processing. As a countermeasure to these disadvantages, Taylor's expansion leads the sine $\epsilon$ and the cos $\epsilon$ to $$\sin \epsilon = \epsilon - \epsilon^3/3! + \epsilon^5/5! - \epsilon^7/7! + \quad (7)$$

$$\cos \epsilon = 1 - \epsilon^2/2! + \epsilon^4/4! - \epsilon^6/6! + \quad (8)$$

Then the first order approximation reduces Formulas 7 and 8 to sin $\epsilon = \epsilon$ and cos $\epsilon = 1$, and the following rotary motion recurrence formula $$x_{i+1} = x_i - \epsilon y_i \quad (9)$$

$$y_{i+1} = \epsilon x_i + y_i \quad (10)$$

is given. According to the rotary motion recurrence formula 9, 10, the rotary motion becomes spiral, and the recurrence formula 9, 10 is not practically used. For the prevention of spiralling of the rotary motion due to errors occurring in rotation, the following rotary motion recurrence formula $$x_{i+1} = x_i - \epsilon y_i \quad (11)$$

$$y_{i+1} = \epsilon x_{i+1} + y_i \quad (12)$$

is used in circle generating DDA computations. The recurrence formula 11, 12 is computed by the hardware exemplified in FIG. 7. The formula 11, 12 enables a rotary motion to be approximated by comparatively simple hardware.

Although the conventional computing device described above enables the rotary motion recurrence formulas to be computed at high speed, a disadvantage with the devices is that computation errors are so large that the devices are not suitable for computations requiring high precision. That is, in drawing a semicircle as indicated by the solid line in FIG. 8(b), an error becomes larger as a computation goes on the rotary motion recurrence formulas, and an error d generated when a point $P_0$ ($x_0$, $y_0$) is rotated by $\pi$ (rad) becomes unnegligible. Here, when a relative error d' (%) is defined by $$d' = (d/R) \times 100 \, (\%)$$

(where R is a radius of a circle), the hardware for the conventional first order approximation as shown in FIG. 8(a) and that for the conventional DDA as shown in FIG. 7 generate the relative errors d' stated in FIG. 9.

The hardware involving such errors cannot be used for, e.g., Hough transforms. That is, in a case where a relative error with respect to a diameter of a circle is about ±0.4% (the quantitized error for the case, for example, where $\rho$(a distance from the origin to a line segment) is divided into 128 sections to Hough transform is within ±0.4%), no practical troubles take place, but for such relative error, the rotation angle $\epsilon$ has to be made very small.

A second object of this invention is to provide a device for computing a rotary motion recurrence formula whose hardware structure is simple, which is suitable for high speed computation and allows large rotation angles to be set while making errors minimum.

SUMMARY OF THE INVENTION

The peak data extracting device of this invention relates extracting peak data from data corresponding to respective coordinates of at least a two dimensional coordinate system and comprises comparing means for comparing data corresponding to required coordinates in the coordinate system with data of coordinates adjacent to the required coordinates; and outputting means for outputting the coordinate values of the required coordinates and data corresponding to the required coordinates when the comparing means judges the data of the required coordinates to be peak data. The peak extracting devices further comprises sorting hardware (a sorting unit) for sorting extracted peak data.

The peak data extracting device this invention relates to may comprise computing means for executing Hough transform on respective plural points to be processed in a first two dimensional coordinate system to give Hough curves in a second two dimensional coordinate system, and outputting data of a histogram of intersections of the Hough curves in correspondence with the coordinates of the intersections; and extracting means for comparing data corresponding to coordinates adjacent to required coordinates in a second coordinate system, and outputting the coordinate values of the required coordinates and data corresponding thereto when the data of the required coordinates is judged to be peak data. The peak extracting device may further comprise sorting hardware (a sorting unit) for sorting extracted peak data.

The device according to this invention for computing the rotary motion recurrence formula $$x_{i+1} = f_x(x_i, y_i, \epsilon)$$

$$y_{i+1} = f_y(x_i, y_i, \epsilon)$$

where coordinates ($x_i$, $y_i$) of one point on the circumference of an approximate circle depicted by an x-y rectangular coordinate system are represented by ($x_i$, $y_i$) and a rotation angle from the coordinates to coordinates ($x_{i+1}$, $y_{i+1}$) of a next point on the circumference are denoted by $\epsilon = 2^{-m}$ (i is a natural number) every rotation by said rotation angle or every a plurality of rotations by said rotation angle comprises first computing means for receiving said coordinates data $x_i, y_i$ and outputting coordinate data $$x_{i+1} = (1 - 2^{-2m-1})x_i - 2^{-m}y_i, \text{ and}$$

second computing means for receiving said coordinate data $x_i, y_i$ and outputting coordinate data $$y_{i+1} = 2^{-m} x_i + (1 - 2^{-2m-1}) y_i.$$

The first computing means may output coordinate data $$x_{i+1} = (1 - 2^{-2m-1}) x_i - (2^{-m} - 2^{-3m}/6) y_i, \text{ and}$$

the second computing means may output coordinate data $$y_{i+1} = (2^{-m} - 2^{-3m}/6) x_i + (1 - 2^{-2m-1}) y_i.$$

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 9 is a view comparing the approximation precisions;

FIG. 11 is a general block diagram of a picture processing device the peak data extracting device according to the embodiment is applied to;

DESCRIPTION OF THE PREFERRED EMBODIMENT

Figure 10A:
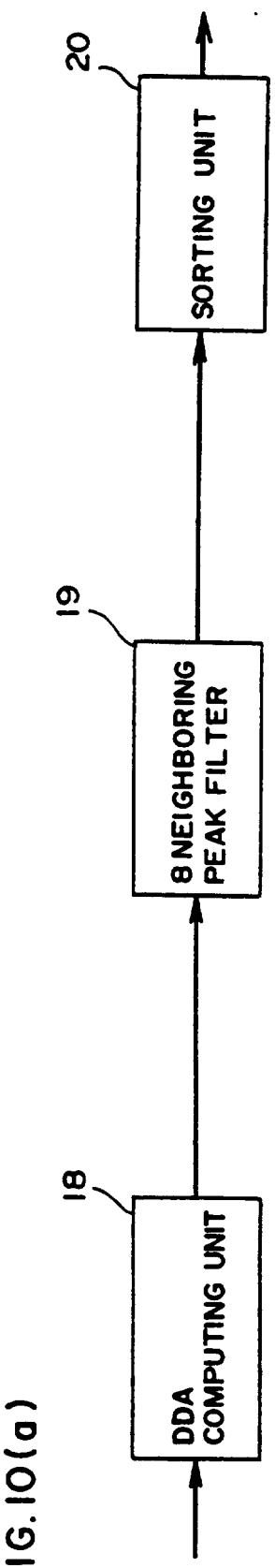
FIG. 10(a) and (b) are views of the peak data extracting device according to one embodiment of this invention.
Figure 10B:
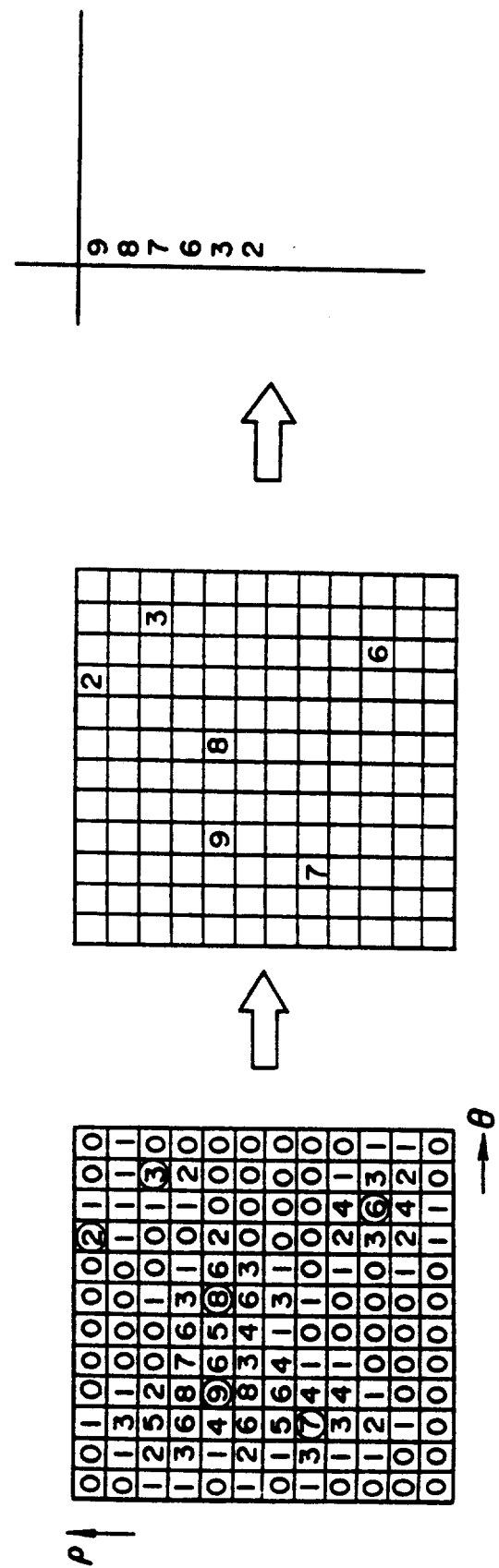

FIG. 10 shows the basic structure and the function of the peak data extracting device according to an embodiment of this invention. As shown in FIG. 10(a), the device according to this embodiment comprises a DDA (data differential analysis) computing unit 18, an eight neighboring peak filter 19, and a sorting unit 20 which are serially connected to each other. These members are provided by hardware and do the functions shown in FIG. 10(b). That is, the DDA computing unit 18 gives Hough curves based on points to be processed on an original picture to derive an occurrence of the intersecting points of the Hough curves. In FIG. 10(b), the maximum occurrence of the points of intersection is "9", and the occurrence decreases to "8", "7", "6" ... and to "0" which corresponds to coordinates $(\rho, \theta)$ containing no point of intersection. The eight neighboring peak filter 19 extracts the peak data (circled in FIG. 10(b)). Thus, six peak data are extracted with the noise components removed. Next, the sorting unit 20 sorts the six peak data.

The embodiment will be explained below in good detail by means of a picture processing device.

Figure 11:
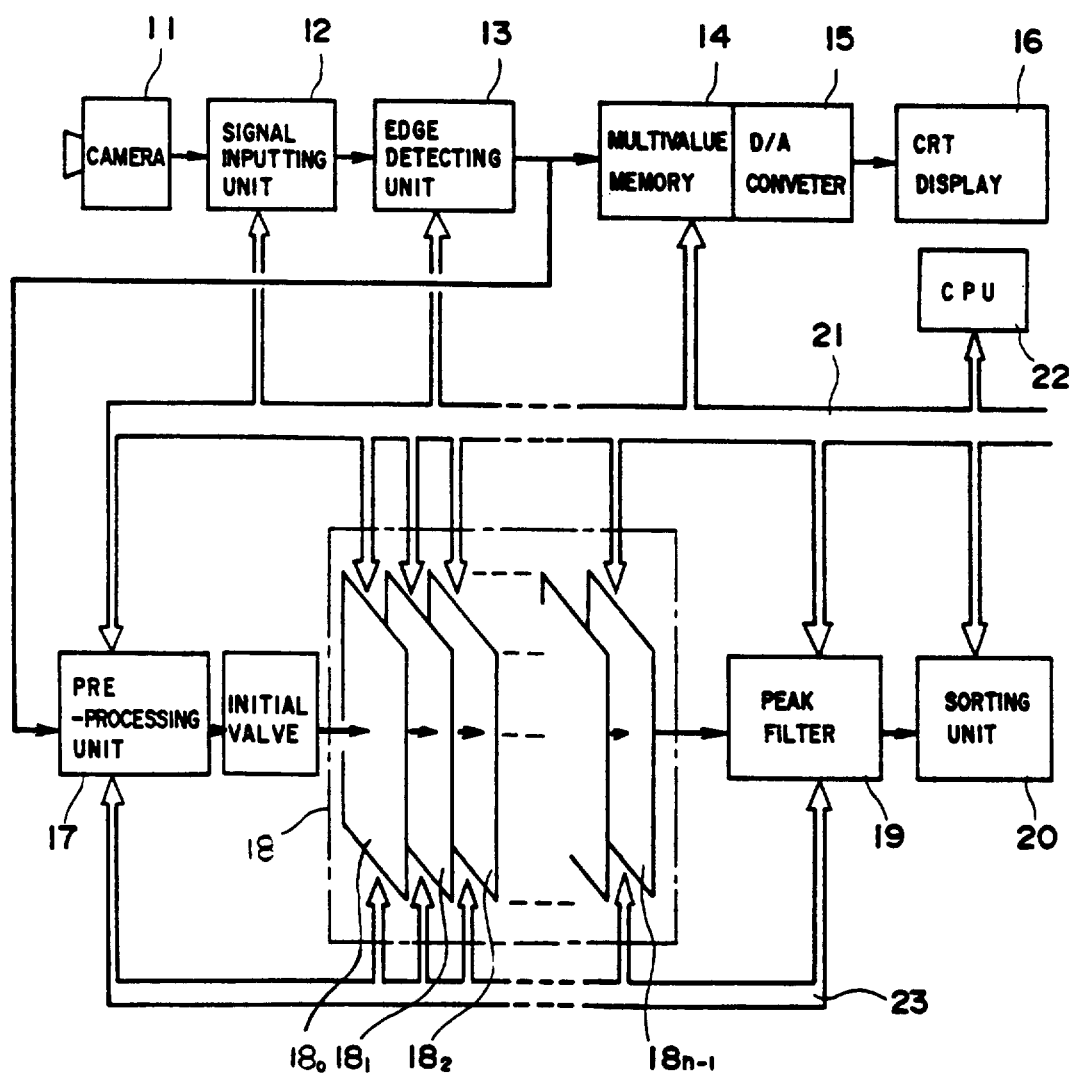

FIG. 11 is a general block diagram of the picture processing device the peak data extracting device according to this embodiment is applied to. As shown in FIG. 11, a camera 11 takes a picture of an object to be processed (e.g., a road, a high speed moving object, or the like) as an original picture. The picture signals are digitized by a signal inputting unit 12 to be supplied to an edge detecting unit 13. As will be described later, the edge detecting unit 13 extracts the edges of the picture signals to produce edged data having different brightnesses, e.g., 512×512 picture element signals (edged picture element signals) and supplies the same to a multivalued memory 14. The multivalued memory 14 stores the edges data for the respective picture elements. Each time one display screen has been scanned, the edged data are supplied to a D/A converting unit 15 to be supplied to a CRT display 16 as analog signals. Thus, the edges data are displayed on the CRT display 16.

On the other hand, the edge picture element signals are supplied to a pre-processing unit 17 to be processed. The pre-processed edge picture element signals are supplied to a DDA computing unit 18 through an initial value computing unit 40. The DDA computing unit 18 comprises DDA computing circuits $18_0 \sim 18_{n-1}$ which are connected serially. A neighboring peak filter 19 and a sorting unit 20 are connected to the DDA computing unit 18 on the side of the output thereof for the neighboring peak filtering and the sorting (which will be described later). The above described circuit elements are connected to a CPU 22 through a VME bus 21 for the control of the signal processing operation and the synchronization of the signal processing timing. The pre-processing unit 17, the DDA computing unit 18, and the peak filter 19 are interconnected by a VME bus 23 for the control of the synchronization of transfer of the computation result of the DDA computing unit and that of brightness value data. Next, a major part of the picture processing device of FIG. 11 will be explained in good detail.

Figure 12:
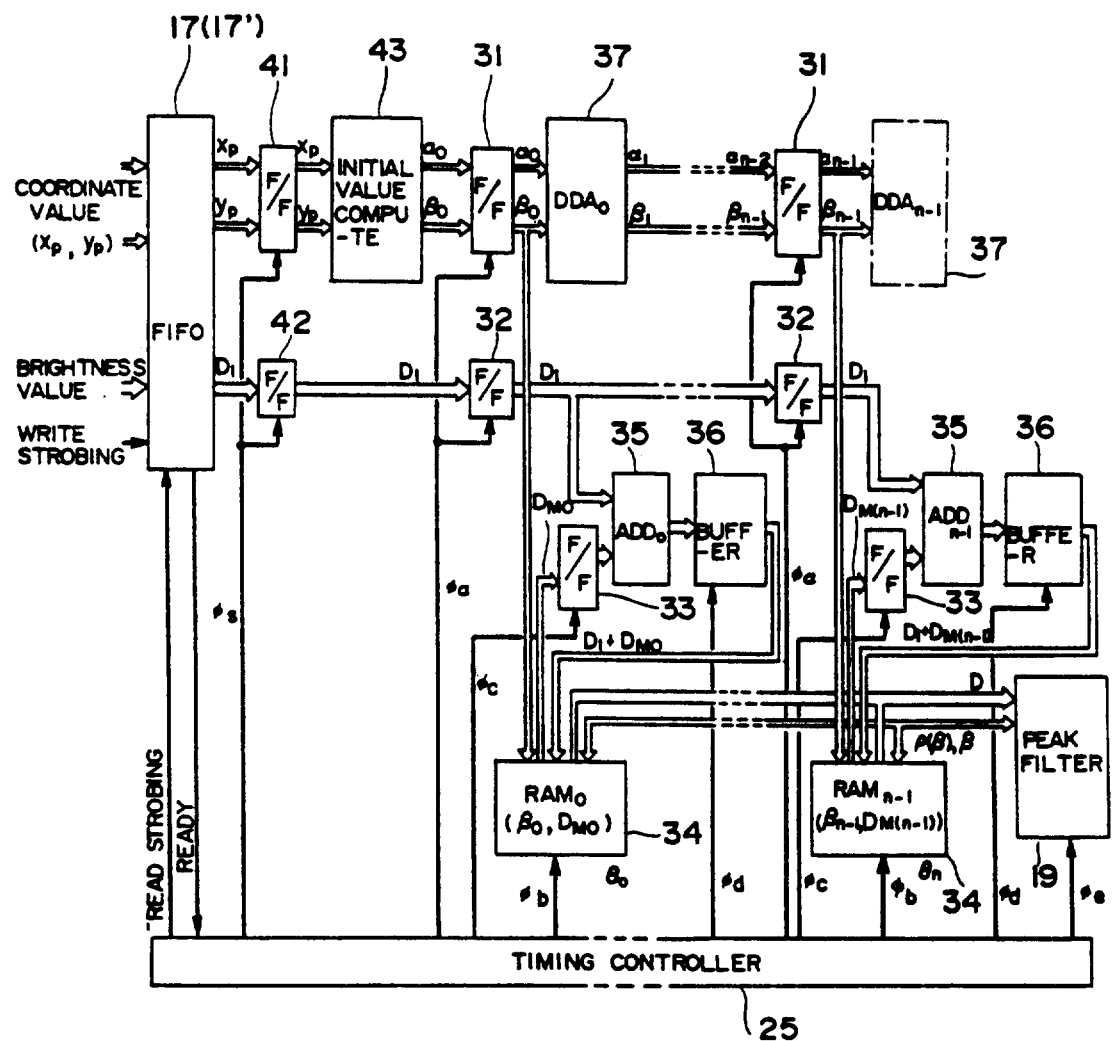
FIG. 12 is a block diagram of a major part of FIG. 11.

FIG. 12 corresponds to the pre-processing unit 17, the initial value computing unit 40, the DDA computing unit 18 and the peak filter 19 (peak data extracting means) in FIG. 11. As shown in FIG. 12, the pre-processing unit 17 is provided by a FIFO (first-in first-out) board 17'. The FIFO 17' inputs as an address signal coordinate values $(X_p, Y_p)$ in X-Y plane of a point to be processed, and edge brightness value data $D_I$ as a data signal. The FIFO 17' transforms the X-Y coordinates to x-y coordinates, sets one or a plurality of windows, and threshold processes at a required level to output the results sequentially FIFO.

The initial value computing unit in FIG. 11 comprises two flip flops (F/F's) 41, 42 and an initial value computing circuit 43. The F/F 41 temporarily stores coordinate values $(x_p, y_p)$ of the coordinates of a point to be processed P. The F/F 42 temporarily stores brightness data of the point to be processed P. The initial value computing circuit 43 computes coordinates of an initial value in an $\alpha-\beta$ rectangular coordinate system, based on the coordinate values $(x_p, y_p)$ to thereby enable the computation of the rotary motion recurrence formula.

Each DDA computing circuit $18_0 \sim 18_{n-1}$ in FIG. 11 comprises, as shown in FIG. 12, three flip flops (F/Fs) 31, 32, 33. The respective F/Fs 31 temporarily store address signals $\alpha_0 \sim \alpha_{n-1}$, $\beta_0 \sim \beta_{n-1}$. The respective F/Fs 32 store brightness value data $D_I$. Each F/Fs 33 temporarily store histogram data $D_{M0} \sim D_{M(n-1)}$ read from respective RAMs 34 ($RAM_0 \sim RAM_{n-1}$). Respective DDAs 37 ($DDA_0 \sim DDA_{n-1}$) compute a rotary motion recurrence formula which will be described later, every rotation by a rotation angle. The respective DDAs 37 are supplied with address signals $\alpha_i, \beta_i$ to output address signals $\alpha_{i+1}, \beta_{i+1}$. Respective ADDs 35 ($ADD_0 \sim ADD_{n-1}$), adders, add the brightness value data $D_I$ from the FIFO 17' and the histogram data $D_{M0} \sim D_{M(n-1)}$. The outputs from the respective ADDs are temporarily stored in a buffer 36 and then supplied to the respective $RAM_0 \sim RAM_{n-1}$. A timing controller 25 outputs timing pulses $\phi_s, \phi_a \sim \phi_e$ to control the timing of the signal processing among these circuit elements and is connected to a command/status interface (I/F) not shown.

Figure 13:
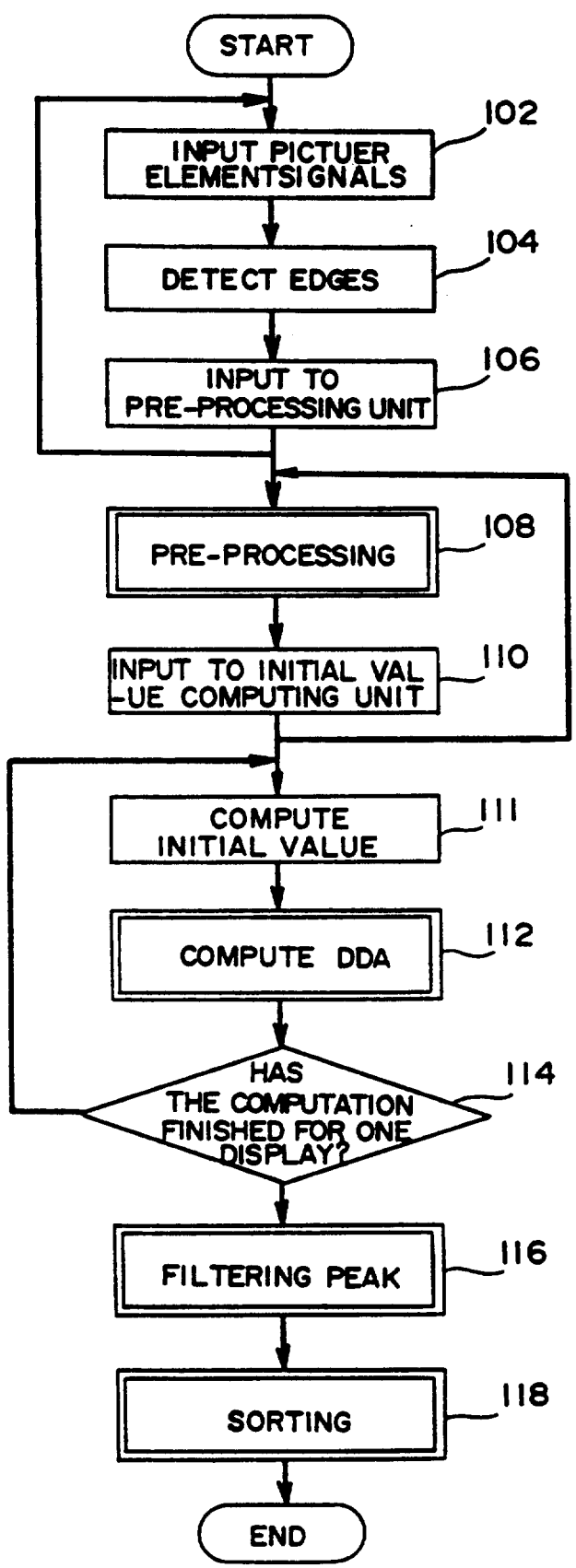
FIG. 13 is the general flow chart of the operation of the picture processing device of FIG. 11.

Next, the general operation of the picture processing device of FIGS. 11 and 12 will be explained with reference to the flow chart of FIG. 13. First, picture element signals for respective points to be processed on an original picture taken by the camera 11 are inputted through the signal inputting unit 12 (Step 102). The signals are edged by the edge detecting unit 13 (Step 104) to input the edged data to the pre-processing unit 17 (step 106). Steps 102~106 are repeated every time picture element signals are inputted, and their results (edged data) are sequentially supplied to the pre-processing unit 17 as digital data.

The pre-processing unit 17 executes the required pre-processing (Step 108) to supply pre-processed data to the initial value computing unit 10 (Step 110). The pre-processing is repeated every time edged data is supplied to the pre-processing unit 17.

Then, the rotary motion recurrence formula is computed in DDA computation to give a Hough curve (Step 112). Before the computation of the rotary motion recurrence formula is started, initial values are computed in Step 111. The computation by the DDA computing unit 18 continues until the DDA computation is completed on the ones of the picture elements on one original picture which have not been removed by the pre-processing unit 17 as out of a window or below a threshold (Step 114). Then the DDA computation is followed by the filtering by the peak filter 19 (Step 116) and the sorting by the sorting unit 20 (Step 118), both of which will be explained below. A final result is an approximate straight line of curves interconnecting the points to be processed on the original picture.

The application of the Hough transform involved in this embodiment will be specifically explained with reference to FIGS. 14(a), (b) and (c), and FIG. 15.

Figure 1A:
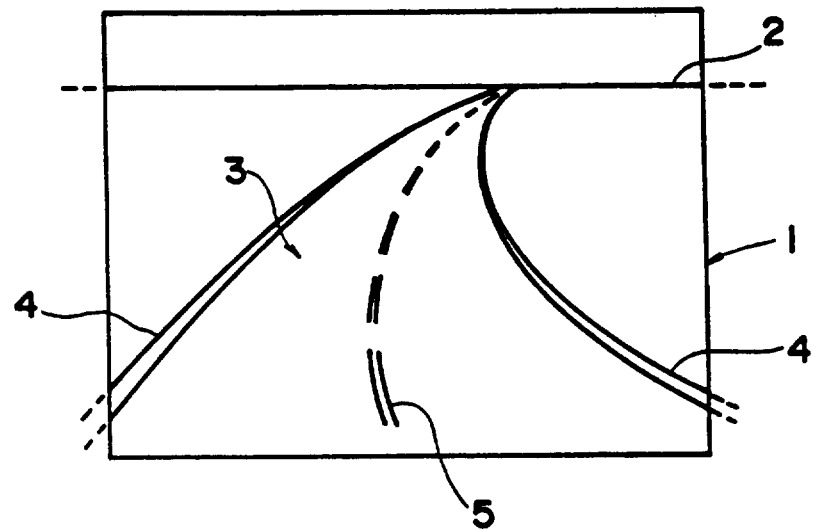
FIGS. 1(a) and (b) are views explaining the recognition of a road.
Figure 1B:
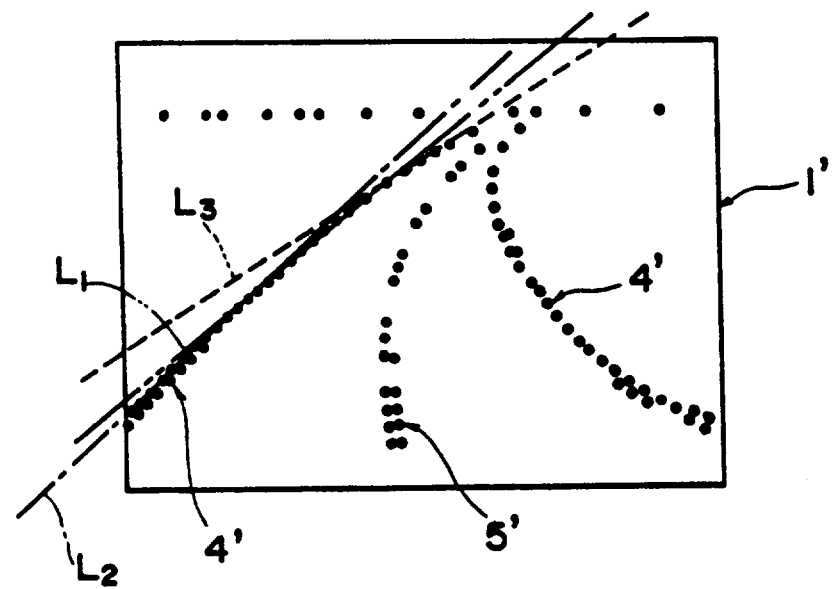
Figure 2:
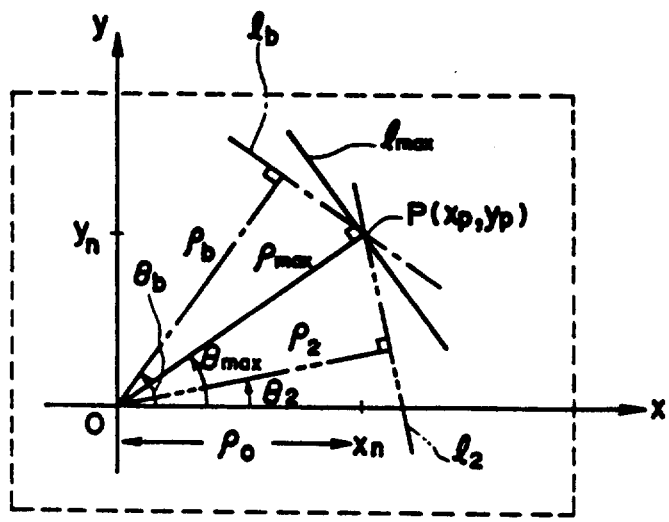
FIGS. 2(a) and (b), FIGS. 3(a) and (b), and FIGS. 4(a) and (b) are views explaining the conventional Hough transform.
Figure 2:
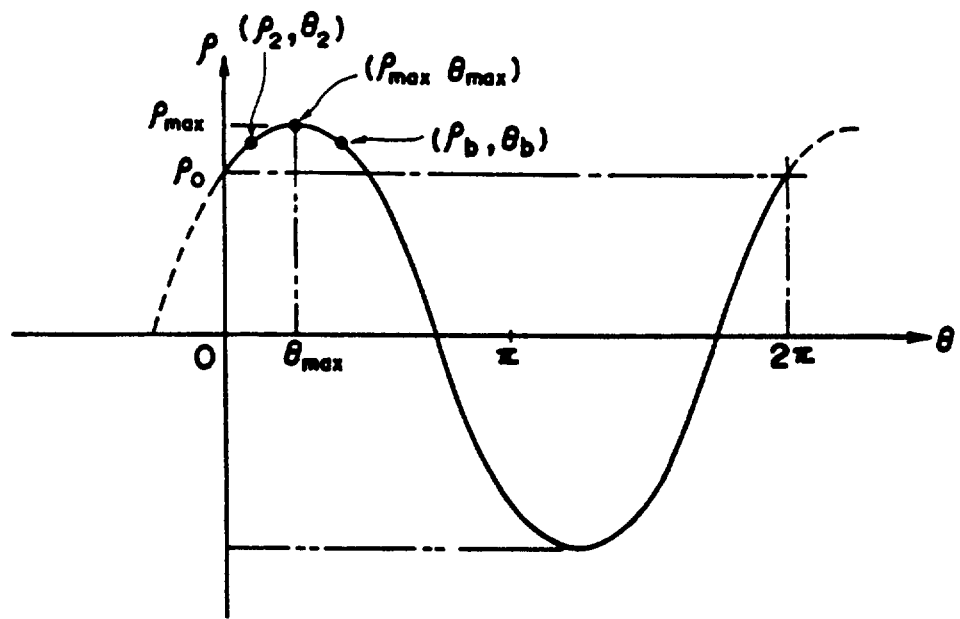

When a Hough curve is obtained with respect to the point $P(x_p, y_p)$ in FIG. 14(a), the Hough curve shown in FIG. 14(c) will be given, as explained above with reference to FIGS. 2(a) and (b). It is seen from the trigonometric function theorem that the trajectory of such sine curve is replaced with that of a circular motion of FIG. 14(b). In other words, it is equivalent to obtaining a circumferential trajectory of the circular motion of FIG. 14(b) that the Hough transformation is performed with respect to the point $P(x_p, y_p)$ in FIG. 14(a) to obtain the Hough curve of FIG. 14(c). Here, the circle of FIG. 14(b) has a radius $$R = \rho_{max} = (x_p^2 + y_p^2)^{\frac{1}{2}} \tag{22}$$

Figure 14A:
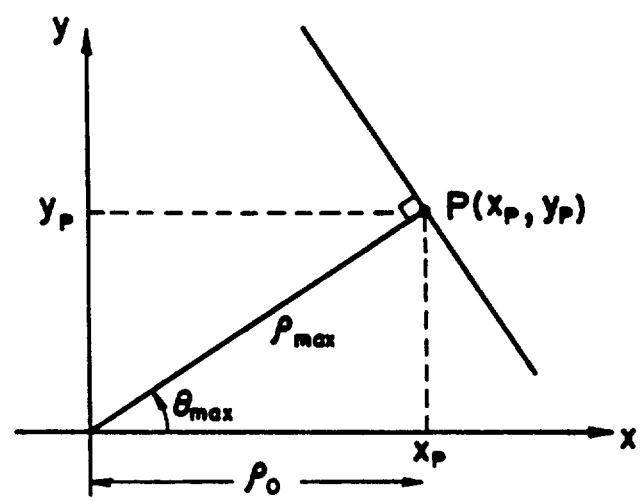
FIGS. 14(a) and (b) are views explaining the Hough transform involved in the embodiment.
Figure 14B:
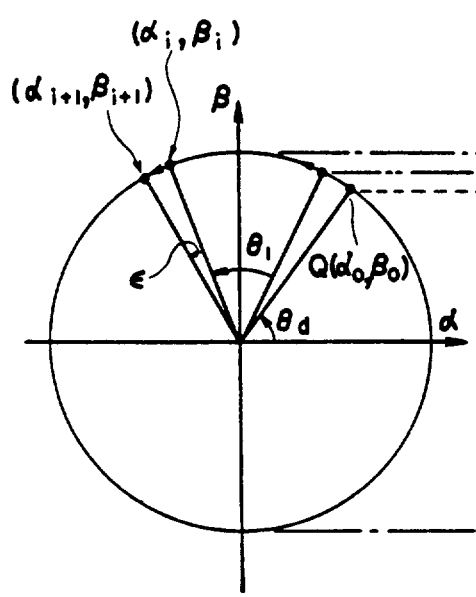

When the circular motion is started at a point $Q(\alpha_0, \beta_0)$ in FIG. 14(b) corresponding to $\theta = 0°$ at the point P $(x_p, y_p)$, the initial value $\theta_d$ is given by the formula $$\theta_d = \pi/2 - \theta_{max}$$

where $\tan \theta_{max} = x_p/y_p$ \hfill (23)

Figure 14C:
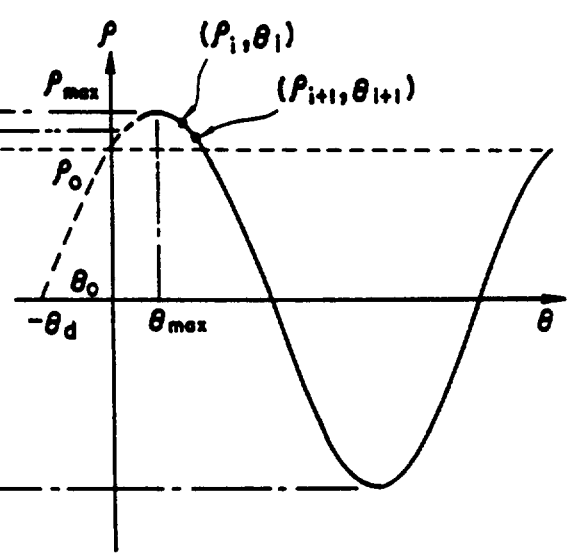

From this viewpoint, the inventors have used the rotary motion recurrence formula in drawing the circle of FIG. 14(b) and found an easy method for transforming the point P $(x_p, y_p)$ of FIG. 14(a) into the Hough curve of FIG. 14(c). Based on the rotary motion recurrence formula, coordinates $(\alpha_{i+1}, \beta_{i+1})$ which are ahead of a point $(\alpha_i, \beta_i)$ by the angle $\epsilon$ in the $\alpha-\beta$ rectangular coordinate system is given by $$\alpha_{i+1} = f_\alpha (\alpha_i, \beta_i, \epsilon)$$

$$\beta_{i+1} = f_\beta (\alpha_i, \beta_i, \epsilon) \tag{24}$$

where i is an integer.

As Formula (24), several DDAs are conventionally known. In one of them, for example, when the rotation angle $\epsilon = 2^{-m}$ (rad) (m = 0, 1, 2, ... )

$$\alpha_{i+1} = \alpha_i - 2^{-m}\beta_i$$

$$\beta_{i+1} = 2^{-m}\alpha_{i+1} + \beta_i \tag{25}$$

The DDA which the inventors have found has higher precision and easier to compute, $$\alpha_{i+1} = \alpha_i(1 - 2^{-2m-1}) - 2^{-m}\beta_i$$

$$\beta_{i+1} = 2^{-m}\alpha_i + \beta_i(1 - 2^{-2m-1}) \tag{27}$$

or $$\alpha_{i+1} = \alpha_i(1-2^{-2m-1}) + \beta_i(-2^{-m} + \epsilon^{-3m}/6)$$

$$\beta_{i+1} = \alpha_i(2^{-m} + \epsilon^{-3m}/6) + \beta_i(1-2^{-2m-1}) \qquad (28)$$

may be used.

Then Recurrence Formula (27) will be used. Before the operation of the circuit of FIG. 12 is specifically explained, this computing method will be explained in good detail.

Figure 15:
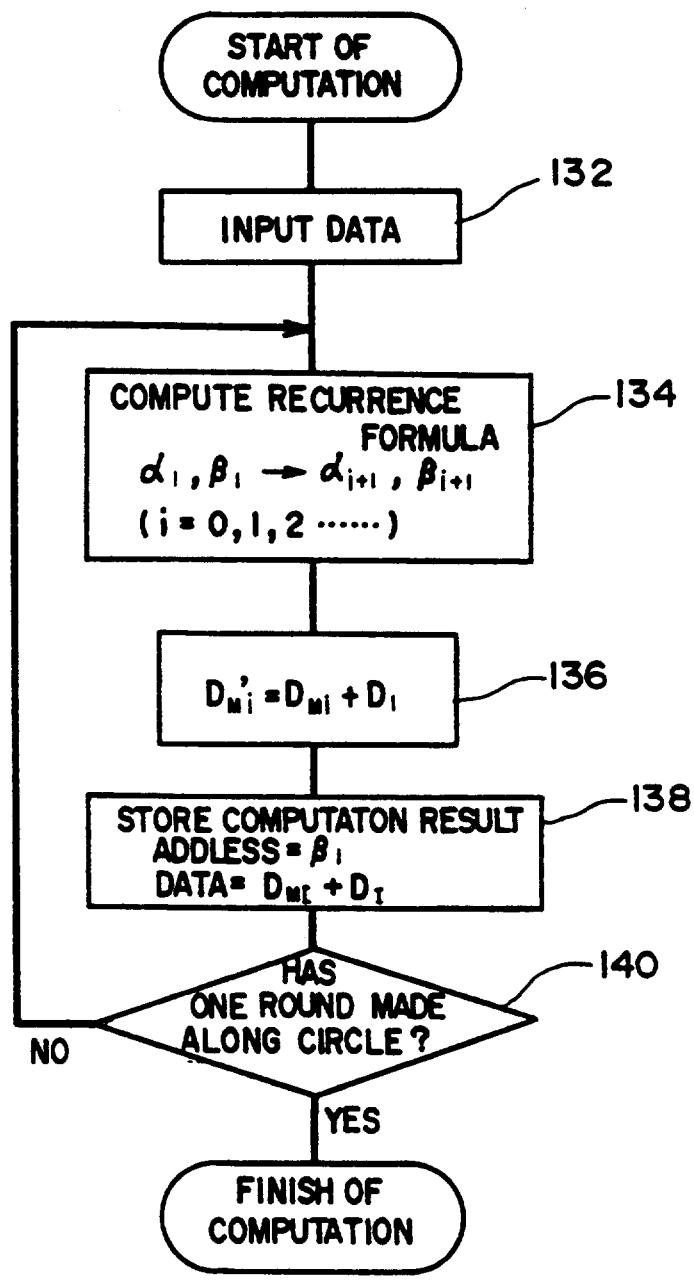
FIG. 15 is the flow chart of the computation of the rotary motion recurrence formula involved in the embodiment.

FIG. 15 is a flow chart of the computing process. The data which have been pre-processed by the FIFO 17' is inputted to give initial values ($\alpha_0$, $\beta_0$) for a computation of the rotary motion recurrence formula (Step 132). In FIG. 14, when the rotary motion is started from the point to be processed $P(x_p, y_p)$ at an arbitrary angle $\theta'$ (=$\theta_0$) (rad), $$\alpha_0 = -x_p \sin\theta' + y_p \cos\theta'$$

$$\beta_0 = x_p \cos\theta' + y_p \sin\theta' \qquad (29)$$

The ($\alpha_0$, $\beta_0$) are computed by the initial value computing unit 40 to be supplied as an address signal to the DDA computing unit 18. In the initial value computing unit 40, values of the sin $\theta'$, cos $\theta'$ are stored firstly in a ROM (not shown) for the computation of Formula 29 using adders and multipliers (not shown) with reference to these data. Compared with the computation of the rotary motion recurrence formula, Formula 29 needs more computation time and is complicated, but Formula 29 needs the computation only once on one point to be processed ($x_p$, $y_p$). This neither much increases the total computing time nor much enlarges the hardware. This initial values computation becomes very simple when the rotary motion starts from the point to be processed P ($x_p$, $y_p$) at $\theta=0°$, $90°$, $180°$ and $270°$.

Subsequently, a value of $\beta_0$ given by Formula 29 is stored as an address in the RAM$_0$, and then $\alpha_1$, $\beta_1$ are obtained by Formula 27. That is, the $\alpha_1$, $\beta_1$ can be given based on an output of the DDA$_0$ by substituting Formula 27 with $\alpha_0$, $\beta_0$ given by Formula 29 (Step 136). Every time the respective DDA$_1$, DDA$_2$, DDA$_3$, .... finish their computation, the results ($\beta_1$, $\beta_2$, $\beta_3$, .....) are subsequently stored in RAM$_1$, RAM$_2$, RAM$_3$, ... as addresses (Step 138). On the other hand, between Steps 134 and 138, brightness data are accumulated. That is, the histogram data D$_{Mi}$ read from the RAM 34 (RAM$_i$) at the address=$\beta_i$, and the brightness data D$_I$ from the FIFO 17' are added to be stored again in the RAM$_i$ (Step 137).

Figure 3A:
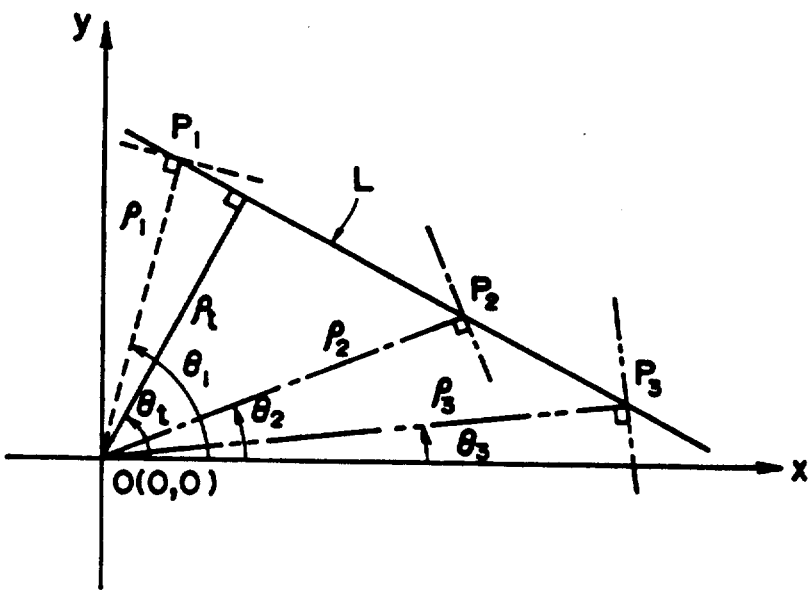
Figure 3B:
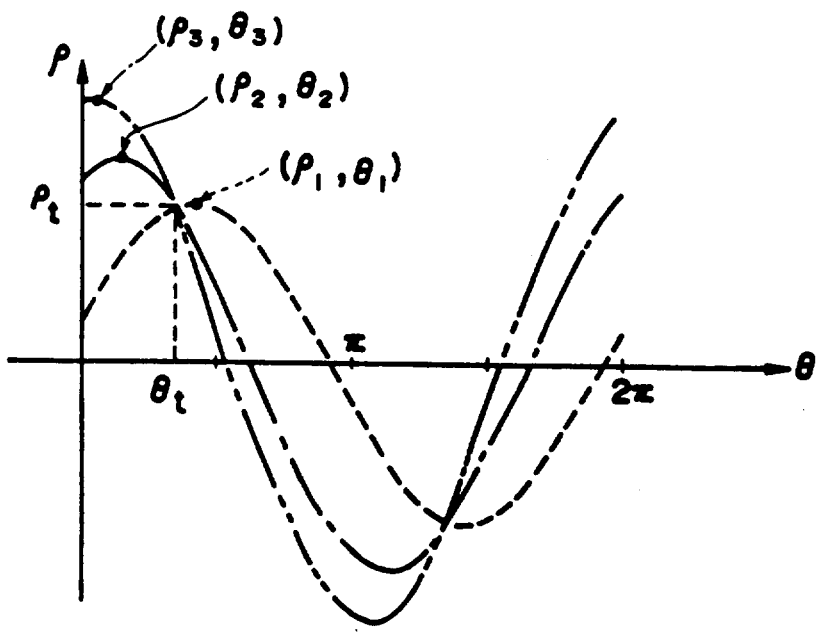
Figure 4:
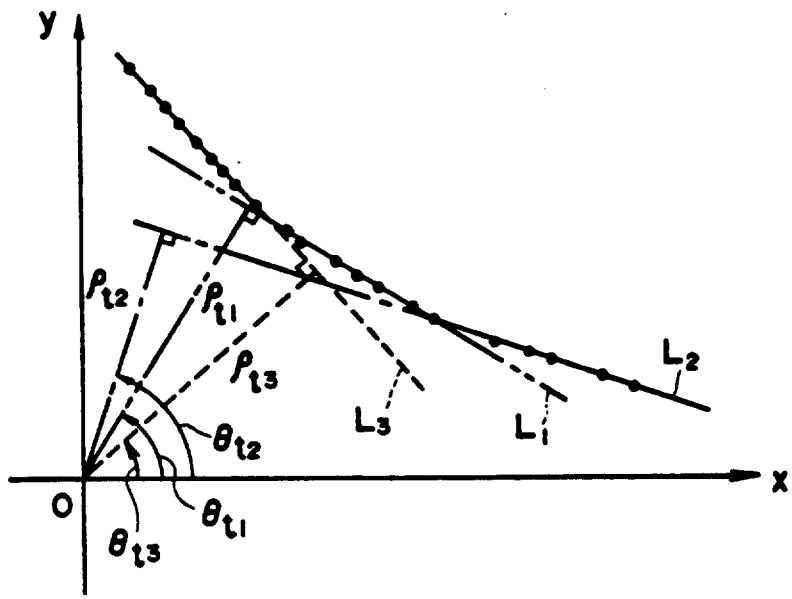
Figure 4:
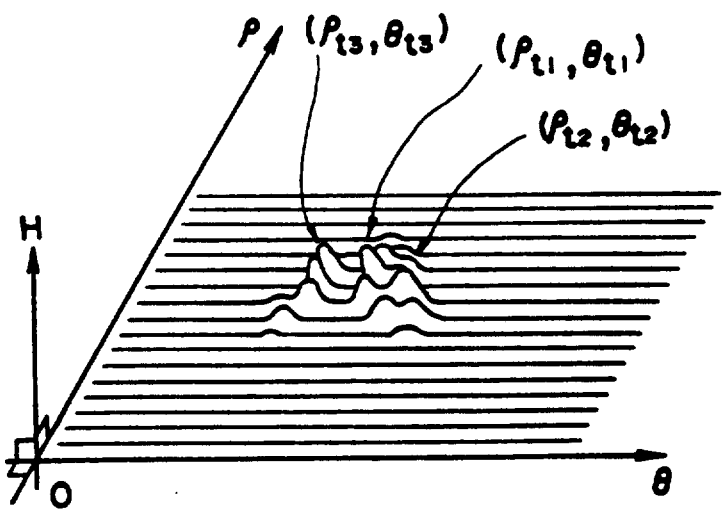
Figure 5:
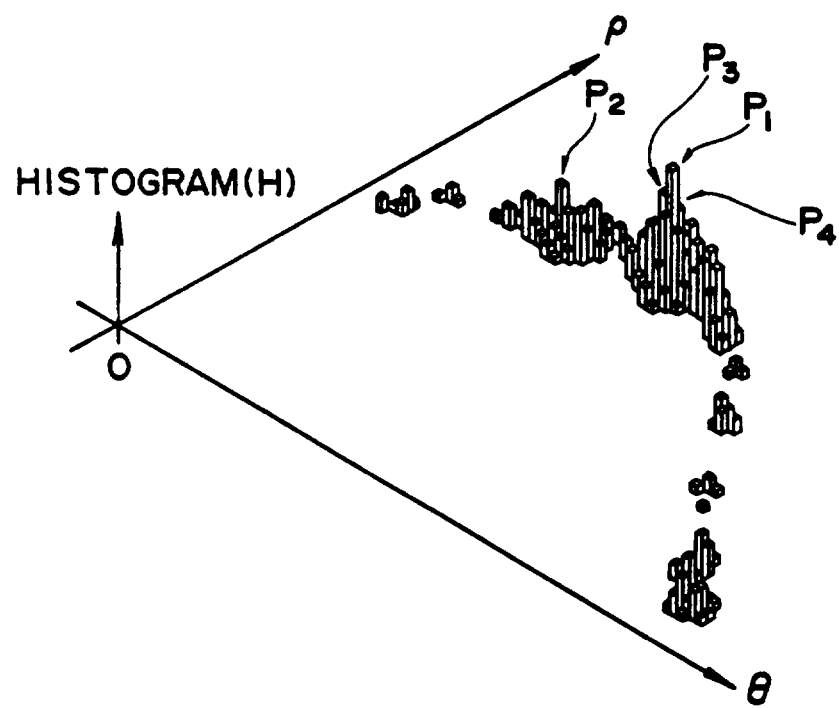
FIG. 5 is a view explaining occurrences of the point of intersection.
Figure 6:
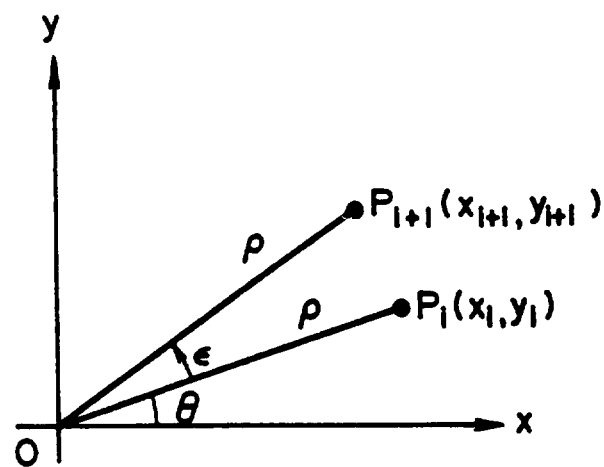
FIG. 6 is a view explaining the rotary motion.

This computation is repeated each rotation by the angle $\epsilon$ until one round has been finished along a circle (Step 140). When one round has been made, a Hough curve with respect at one point to be processed on an original picture is given, based on the thus stored values $\beta_0$, $\beta_1$, $\beta_2$, $\beta_3$, ..., and values (rotation angle $\epsilon$) of $\theta_0$, $\theta_1$, $\theta_2$, ..., and also results weighted with brightness data (D$_{M0}$, D$_{M1}$, ... D$_{M(n-1)}$) are given. When the processing of FIG. 15 is executed on all the points to be processed on the original picture, a plurality of Hough curves weighted with brightness data are given in the $\rho-\theta$ coordinate system, and these Hough curves have points of intersection in FIG. 3($b$).

The operation following the flow chart of FIG. 15 will be explained in more detail with reference to FIG. 12.

Step 132 of inputting data in FIG. 15 is executed by supplying a ready signal from the FIFO 17' in FIG. 12 to the timing controller 25 and supplying a read strobing signal from the timing controller 25 to the FIFO 17', then storing the coordinates ($x_p$, $y_p$) of the point to be processed P is stored by the F/F 41, and storing a brightness data D$_I$ of the point P by F/F 42. In synchronization with a timing pulse $\phi_s$ of the timing controller 25. The ($x_p$, $y_p$) are outputted by F/F 41, and the initial values computing unit 40 gives initial values ($\alpha_0$, $\beta_0$) for the recurrence formula, based on the coordinate values ($x_p$, $y_p$) of the point to be processed P.

The computation of the recurrence formula in Step 136 is performed by supplying an output of the initial values computing circuit 43 from the F/F 17' to the F/F 31 as address signals $\alpha_0$, $\beta_0$, and supplying brightness data D$_I$ of the point to be processed from the F/F 42 to the F/F 32. The input of the address signals and the data to the F/Fs 31 and 32 are performed in synchronization with a timing pulse from the timing controller 25. Address signals $\alpha_0$, $\beta_0$ from the F/F 31 are inputted to a first DDA$_0$ in synchronization with a rise or fall of a timing pulse $\phi_a$.

In the DDA$_0$, the processing of step 136 in FIG. 56 is performed. That is, the computation of the recurrence formula in accordance with Formula 7 is executed, and a computation result (address signals $\alpha_1$, $\beta_1$) is supplied to a next DDA$_1$ (not shown). Recurrence Formula 27 basically neither includes computations of the trigonometric function and multiplications, nor needs to refer to a memory table (ROM). This makes the computation speedy and easy, and give sufficient precision (little error) for the rotary motion.

DDA$_0$ comprises the same elements as DDA$_1$~DDA$_{n-1}$. Its specific structure and operation will be explained later.

The address signal $\beta_0$ stored in the F/F 31 is supplied also to the RAM$_0$ (34). In response to this address signal the histogram data D$_{M0}$ stored in the RAM$_0$ is read out. That is, RAM$_0$ has stored at the address of $\beta_0$ the histogram data D$_{M0}$ with respect to the other points to be processed every rotation by the angle $\theta_0$ ($\theta'=0$) beforehand (based on the preceding computation of the ADD$_0$). Accordingly, synchronously with the address signal $\beta_0$ supplied from the F/F 31 to the RAM$_0$, the histogram data D$_{M0}$ is supplied from the RAM$_0$ to the F/F 33.

Subsequently, in synchronization with a timing pulse $\phi_c$ from the timing controller 25, the histogram data D$_{M0}$ is supplied from the F/F 33 to the ADD$_0$. The ADD$_0$ has been supplied by the F/F 32 with brightness data D$_I$ of the point to be processed ($x_p$, $y_p$). Accordingly, in the ADD$_0$, the rotation angle $\theta_0$ which has been stored in the RAM$_0$, the histogram data D$_{M0}$ corresponding to the address $\beta_0$, the rotation angle $\theta_0$ of the point being processed ($x_p$, $y_p$), and the brightness value data D$_I$ corresponding to the address $\beta_0$ are added (Step 137 in FIG. 15). The addition result (D$_{M0}'$=D$_{M0}$+D$_I$) is temporarily held by the buffer 36 and then is supplied to the RAM$_0$ in synchronization with a timing pulse $\phi_d$ to be stored at an address $\beta_0$ of the RAM$_0$ corresponding to $\theta_0$ in accordance with Step 138 in FIG. 15.

Figure 16:
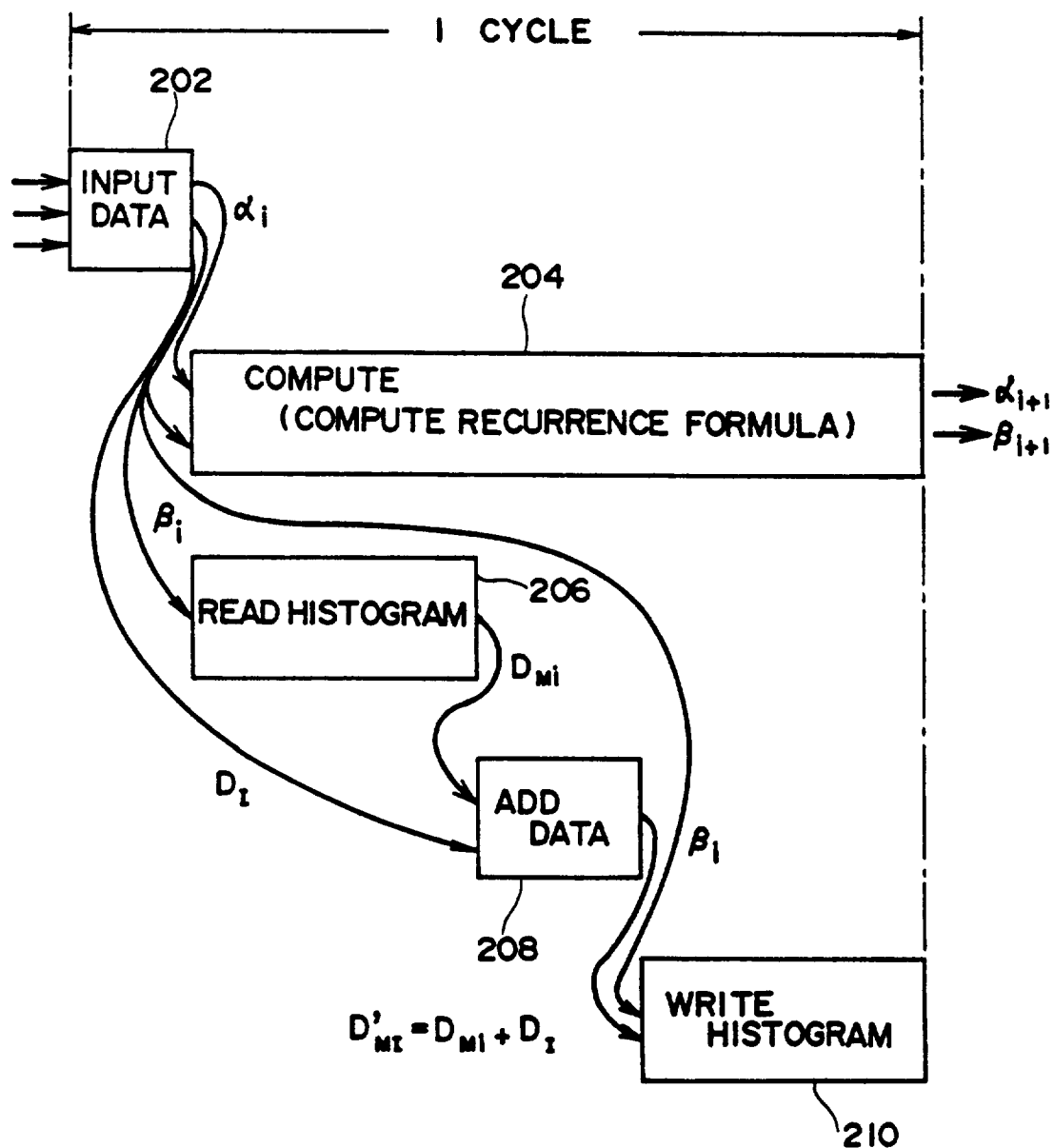
FIG. 16 is a view explaining one cycle of the processing.

The above described one cycle of processing will be explained below in terms of the DDA computing circuit 18$_i$ (i=1, 2, ... n−1) with reference to FIG. 16.

After address signals $\alpha_i$, $\beta_i$ which are results of the computation of address signals (initial values) $\alpha_0$, $\beta_0$ corresponding to coordinate values ($x_p$, $y_p$) of a point to be processed to be $\alpha_1$, $\beta_1$, to be $\alpha_2$, $\beta_2$, to ....., and to be $\alpha_i$, $\beta_i$, the brightness value data $D_I$ of the point to be processed ($x_p$, $y_p$) is supplied respectively from the F/Fs 31 and 32 to be held (Step 202), and address signals $\alpha_i$, $\beta_i$ from the F/F 31 are supplied to the $DDA_i$, the computation of the recurrence formula is executed, based on the address signals $\alpha_i$, $\beta_i$ in Step 204. Address signals $\alpha_{i+1}$, $\beta_{i+1}$, a result of the computation, are supplied to the F/F 31 positioned before the $DDA_{i+1}$ in the next DDA computation circuit $18_{i+1}$ in synchronization with the finish of one cycle of processing.

On the other hand, in response to the address signal $\beta_i$, reading of the histogram data $D_{Mi}$ is performed in Step 206. This reading is performed by supplying the address signal $\beta_i$ from the F/F 31 to the $RAM_i$ to store the histogram data $D_{Mi}$ at the address of $\beta_i$ in the F/F 33 in FIG. 12. In Step 208 the brightness data $D_I$ of the histogram data $D_{Mi}$ is added. Step 208 is executed by the $ADD_i$ in FIG. 12. Then, the histogram data $D_{Mi}' = D_{Mi} + D_I$ is written in the $RAM_i$ at the address $\beta_0$ in Step 210.

The storing of the histogram data will be explained in more detail with reference to FIG. 17.

Figure 17:
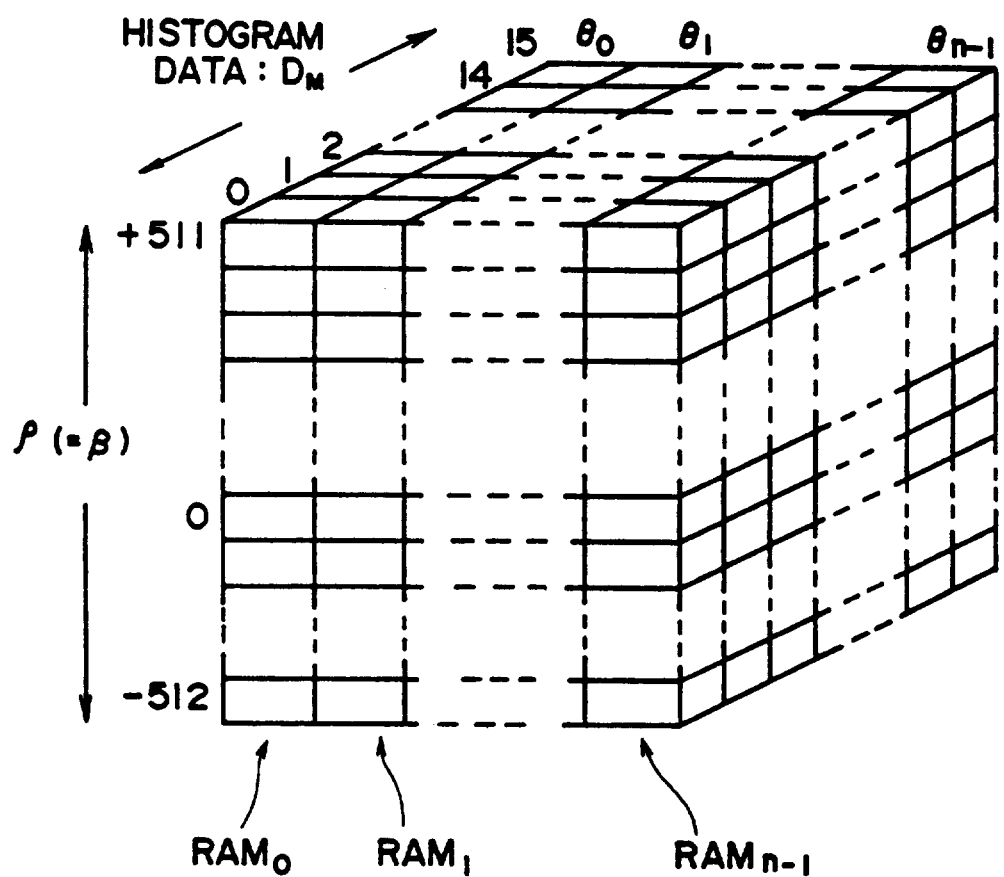
FIG. 17 is a diagrammatic view of the histogram memory.

FIG. 17 shows the concept of the histogram memory of the RAM 34 in FIG. 12. As shown, the memory has 25 regions $RAM_0 \sim RAM_{n-1}$ which correspond respectively to the rotation angles $\theta_0(=\theta'), \theta_1, \ldots \theta_{n-1}$. Each RAM region has addresses $\beta(=\rho) + 511 \sim 0 \sim -512$. Each address can store 16 bit histogram data (brightness value). Accordingly, when the $DDA_i$ computes $\alpha_{i+1}$, $\beta_{i+1}$ corresponding to the rotation angle $\theta_{i+1}$ based on the address signal $\alpha_i$, $\beta_i$, using Recurrence Formula 27, the address signal $\beta_i$ is supplied to the $RAM_i$, and the histogram data $D_{M(i)}$ is read and combined with the brightness data $D_I$ of a point to be processed. Then the histogram data ($D_{Mi} + D_I$) is written at the address $\beta_i$.

As described above, the computation of Recurrence Formula 27 is performed in the pipe line system in which the address signals $\alpha_i$, $\beta_i$ are transferred sequentially. During the computation of the address signals $\alpha_i$, $\beta_i$ to the address signals $\alpha_{i+1}$, $\beta_{i+1}$, the brightness data $D_I$ and the histogram data $D_{Mi}$, are added by the $ADD_i$ and stored in the RAM $_i$ which shortens the time required for one cycle of processing.

Figure 18:
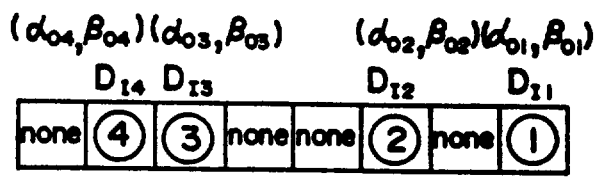
FIGS. 18(a) to (e) are views explaining the pipe line processing involved in the embodiment.
Figure 18:
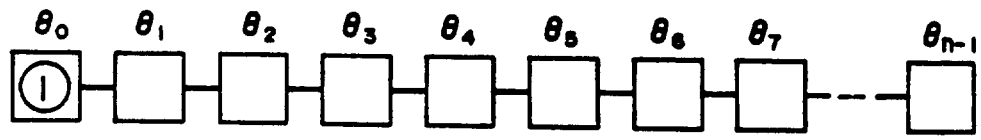
Figure 18:
Figure 18:
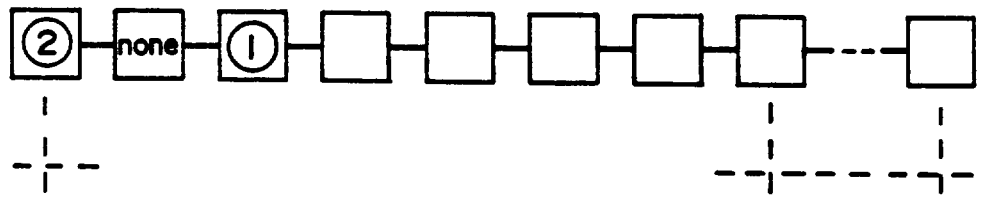
Figure 18:

This one cycle of processing is performed by the DDA computing circuits $18_0 \sim 18_{n-1}$ simultaneously and parallelly. That is, as in FIG. 18(a), "data 1,none, , 2, none, none, 3, 4 none" is inputted by th FIFO 17' in the first cycle the data is as shown in FIG. 18(b), In the second cycle, the data is as shown in FIG. 18(c). In the third cycle, the data is as shown in FIG. 18(d). The same processing follows. In the eighth cycle, the data is as shown in FIG. 18(e). In FIG. 18(a), ($\alpha_{01}$, $\beta_{01}$)$\sim$($\alpha_{04}$, $\beta_{04}$) are address signals corresponding respectively to coordinate values ($x_{p1}$, $y_{p1}$)$\sim$($x_{p4}$, $y_{p4}$) of the points to be processed $P_1 \sim P_4$, and $D_{I1} \sim D_{I4}$ are brightness data of the respective points to be processed $P_1 \sim P_4$. $\theta_0 \sim \theta_{n-1}$ in FIGS. 18(b)-(e) are rotation angles from the points (angle) $\theta'$ where initial values ($\alpha_0$, $\beta_0$) are obtained and and correspond respectively to the $RAM_0 \sim RAM_{n-1}$ in FIG. 12.

Next, the neighboring peak filtering following the Hough transform will be explained. The peak filtering is a major characteristic of the peak data extraction performed by this invention.

Figures 19A, 19B:
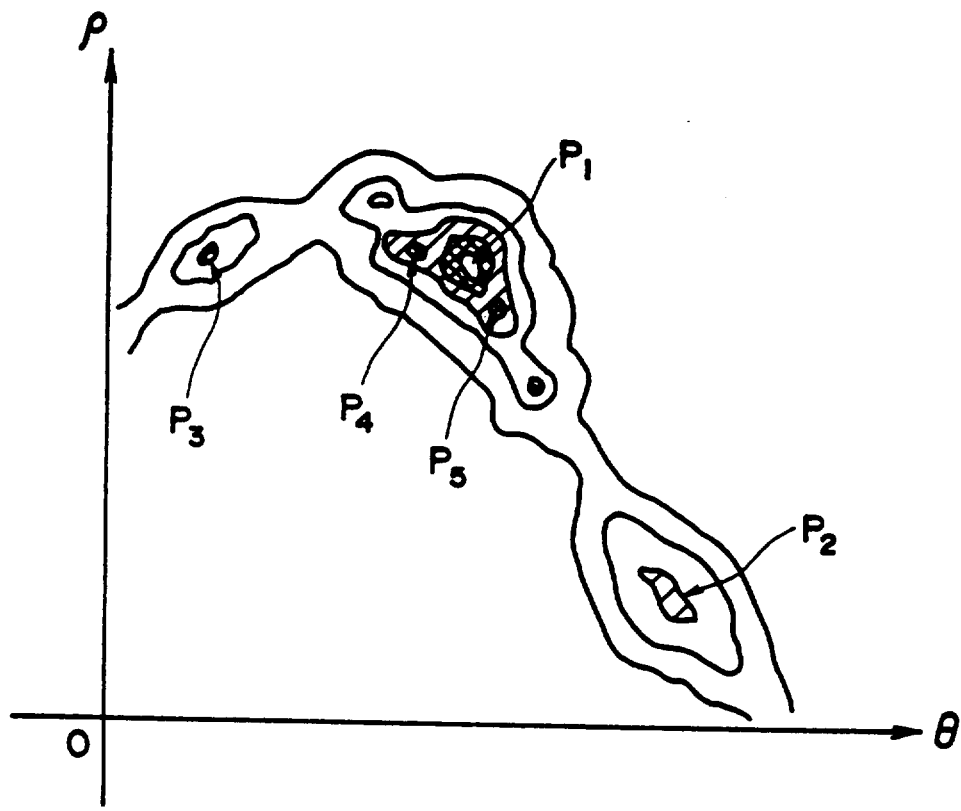
FIGS. 19(a) and (b) are views explaining the eight neighboring peak filtering.

Here it is assumed that when the points of intersection of Hough curves are expressed in the $\rho - \theta$ plane, FIG. 19(a) is given. FIG. 19(a) does not always agree with histograms obtained by this invention, because in FIG. 19(a) histograms H which are weighted with brightness value data (brightness change ratios) of the picture elements of the original picture with respect to the points of intersection appearing every unit of the $\rho - \theta$ plane are expressed in the contour for easy understanding.

Here it is assumed that the histogram at the point P1 in FIG. 19(a) is high and also high at the points P2 and P3. When the neighboring peaks of the point P1 are considered, high histograms take place at the points P4 and P5. But what is especially important is to find the points P1$\sim$P3 spaced from each other. For example, the point P1 corresponds to the shoulder lines of the road; the point P2, the center line thereof; and the point P3, the shoulder lines of the forward curved portion of the road. But in many cases the points P4 and P5 correspond to partial curves of the shoulder lines, which are, in many cases, noise components in picture processing.

An eight neighboring peak filtering, for example, lessens such noise components. That is, using an eight neighboring peaks filter as shown in FIG. 19(b), the histograms at the points of intersections of the Hough curves are compared between areas $F_1 \sim F_9$. When the formula $$F_5 > F_1 \sim F_4, F_6 \sim F_9$$

is satisfied, the data in the area $F_5$ is to be detected. Specifically, in the case, for example, where one unit (element area) of picture elements in the $\rho - \theta$ plane is allocated to each area $F_1 \sim F_9$, the formula $F_5 > F_1 \sim F_4$, $F_6 \sim F_9$ is satisfied when the histogram number of the points of intersection are

| $F_1 = 6$, | $F_2 = 8$, | $F_3 = 4$, |
|---|---|---|
| $F_4 = 2$, | $F_5 = 14$, | $F_6 = 10$, |
| $F_7 = 7$, | $F_8 = 9$, | $F_9 = 8$. |

Then the point of intersection $F_5$ is to be detected. In contrast to this, when

| $F_1 = 8$, | $F_2 = 4$, | $F_3 = 3$, |
|---|---|---|
| $F_4 = 14$, | $F_5 = 10$, | $F_6 = 7$, |
| $F_7 = 9$, | $F_8 = 8$, | $F_9 = 2$, |

$F_5 < F_4$ is given, and thus the area $F_5$ is not data to be detected.

Figure 20:
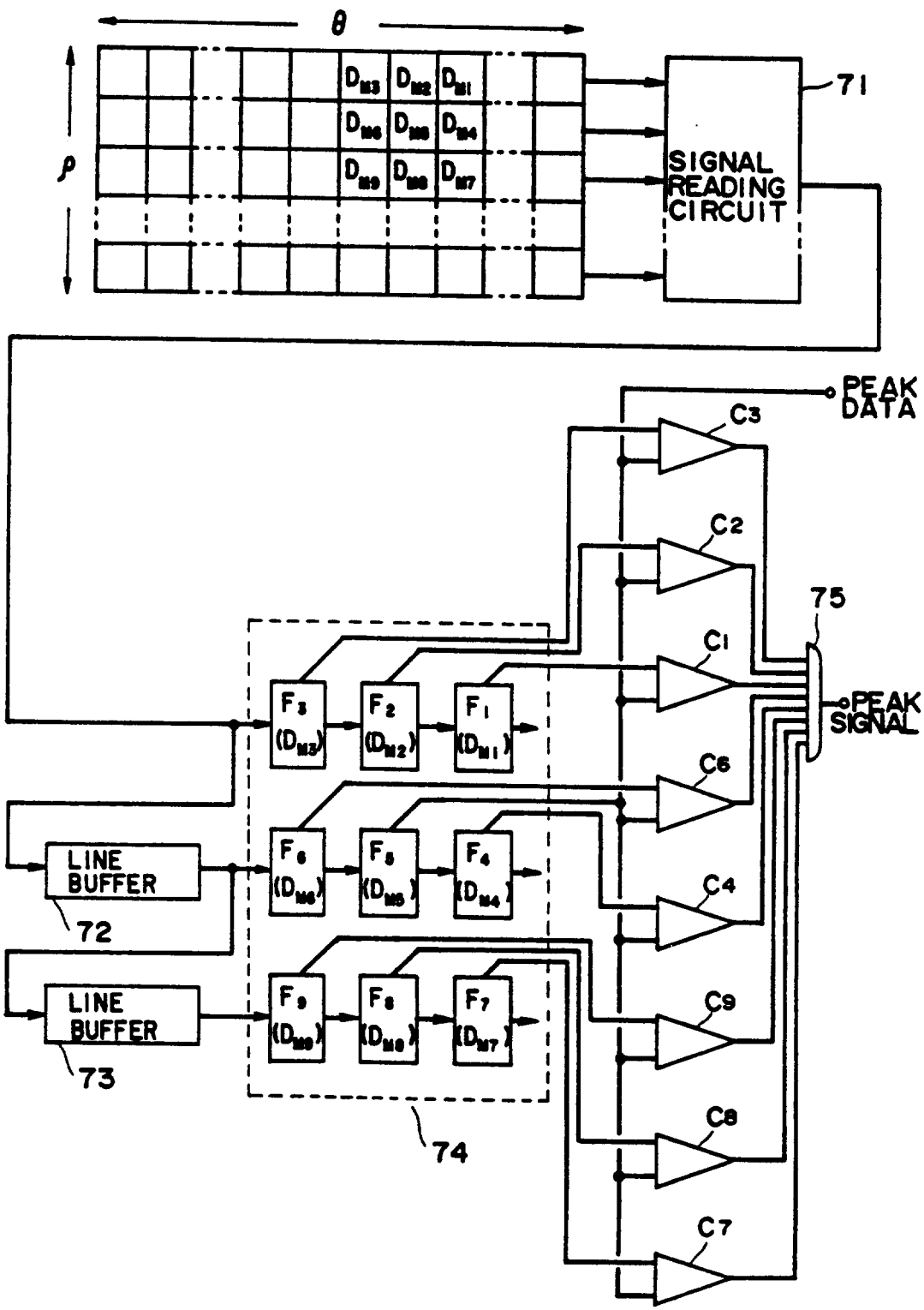
FIG. 20 is a block diagram of the neighboring peak filter.

The above described filtering is performed by means of a neighboring peak filter in FIG. 20. That is, a signal reading circuit 71 is affixed to the histogram memory (RAM 34) of FIG. 17, and data read from the signal reading circuit 71 is supplied to a shift register 74 having nine storing region ($F_1 \sim F_9$) through the line buffer 72. The histogram data $D_M$ of the registers $F_1 \sim F_4$ and those $D_M$ of the shift registers $F_6 \sim F_9$ are inputted to the comparators $C_1 \sim C_4$ and $C_6 \sim C_9$ respectively. The histogram data of the shift register $F_5$ is inputted to all the comparators. Then, when the histogram data of the respective areas of the histogram memory 34 are $D_{M1} \sim D_{M9}$ as shown in FIG. 20, the value of the data $D_{M5}$ is compared with the rest data $D_{M1} \sim D_{M4}$, $D_{m6} \sim D_{M9}$. When the data $D_{M5}$ is maximum, a peak signal "H" is outputted from an AND gate. The data $D_{M5}$ at this time becomes a peak data.

The above described filtering makes it possible that the points P2 and P3 where histograms are high can be detected, free from the influence by the points P4 and P5 in FIG. 19(a). Without the filtering, points of the second highest histogram next to the point P1 of the first highest histogram are P4 and P5, and the points P2 and P3, which have to be detected as points of the second and the third highest histograms are of the fourth and the fifth highest histograms. This makes the subsequent signal processing very difficult.

Figure 21A:
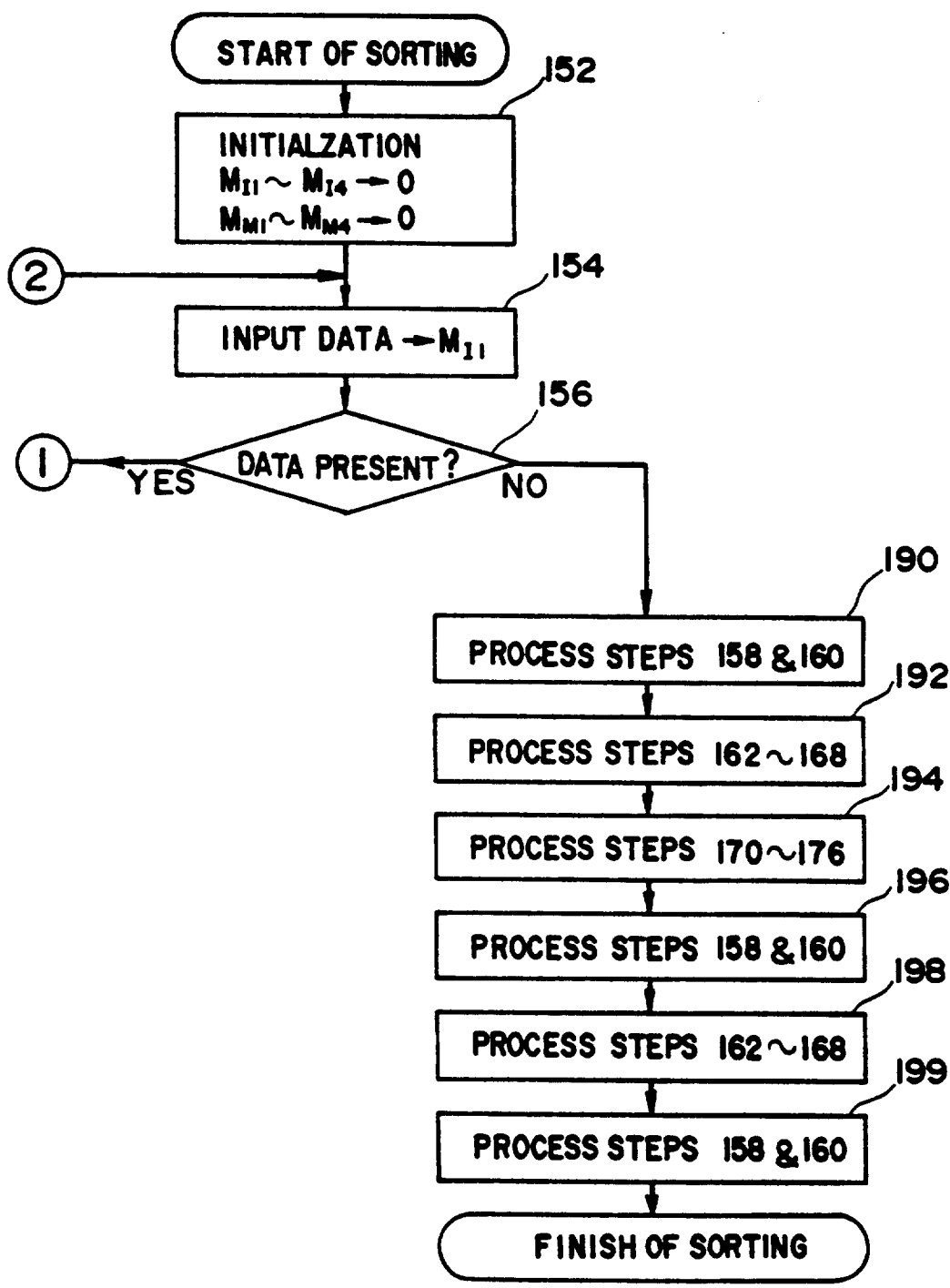
FIG. 21 is the flow chart of the sorting.
Figure 21B:
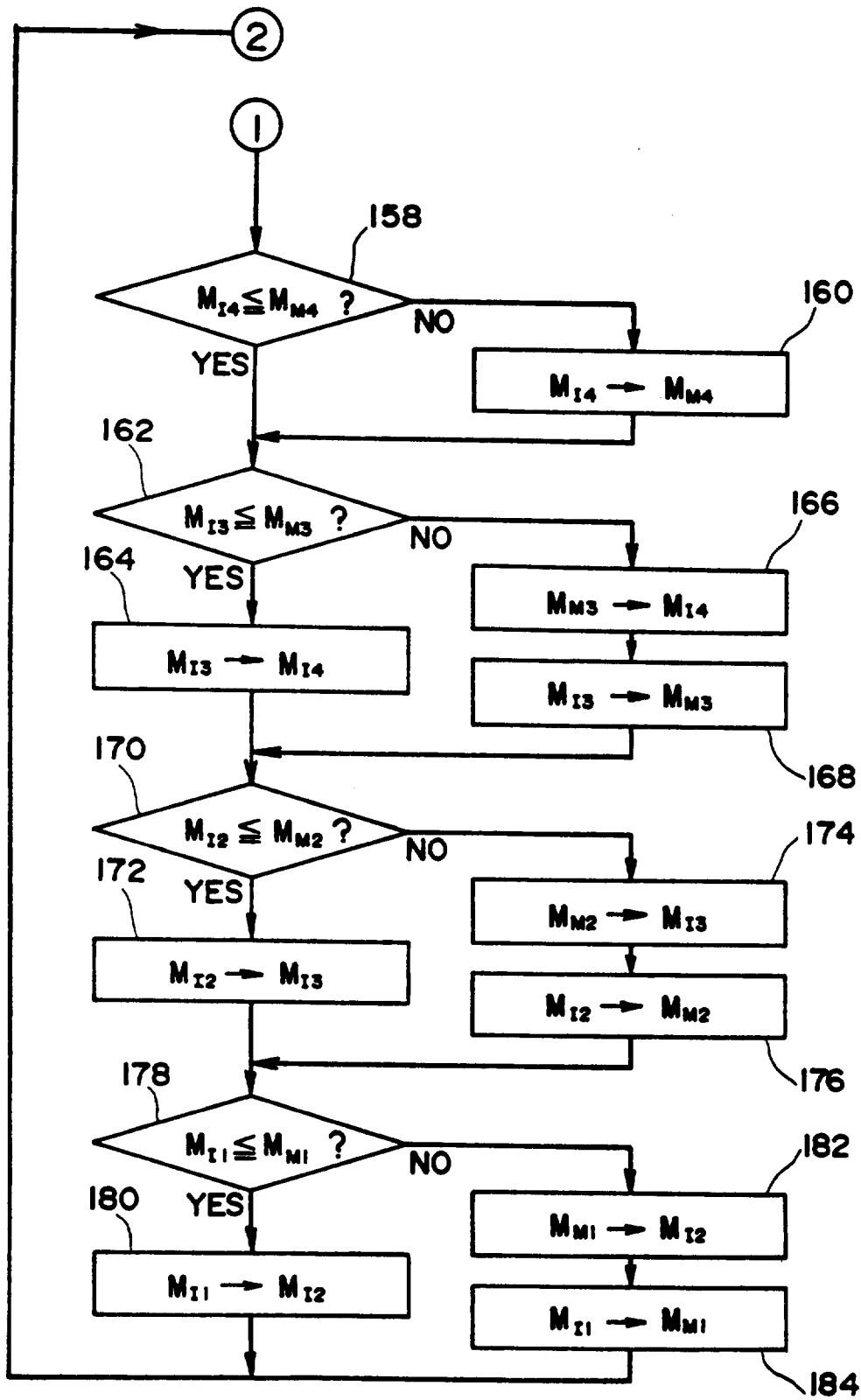

The sorting processing of Step 118 in FIG. 13 will be explained below with reference to the flow chart of FIG. 21.

For the sorting processing, a plurality of input memories (transfer memories) $M_{I1} \sim M_{I4}$ (4 for simplicity), and comparison memory (result memories) $M_{M1} \sim M_{M4}$ (4 for simplicity) are initialized (Step 152). Next, data is inputted to the input memory $M_{I1}$ (Step 154). When it is judged that this input data is present in Step 156, Steps 158~184 will follow, and when judged this input data is absent, Steps 190~199 will follow. Steps 190, 196 and 199 perform the same processing as Steps 158 and 160 respectively. Steps 192 and 198 perform the same processing as Step 162~168 respectively. Step 194 performs the same processing as Steps 170~176.

Steps 158, 162, 170 and 178 respectively compare the magnitudes of the content of the corresponding input memory $M_I$ and that of the comparison memory $M_M$ and finds $M_I \leq M_M$, the content of the input memory $M_I$ is transferred to the next Steps 164,172 and 180. Contrary to this, when $M_I > M_M$, the content of the comparison memory $M_M$ is transferred to the next input memory $M_I$ (Steps 168, 176, 184). Finally the memories $M_{M1} \sim M_{M4}$ hold 4 input data in the sequential order of the magnitude.

Figure 22A:
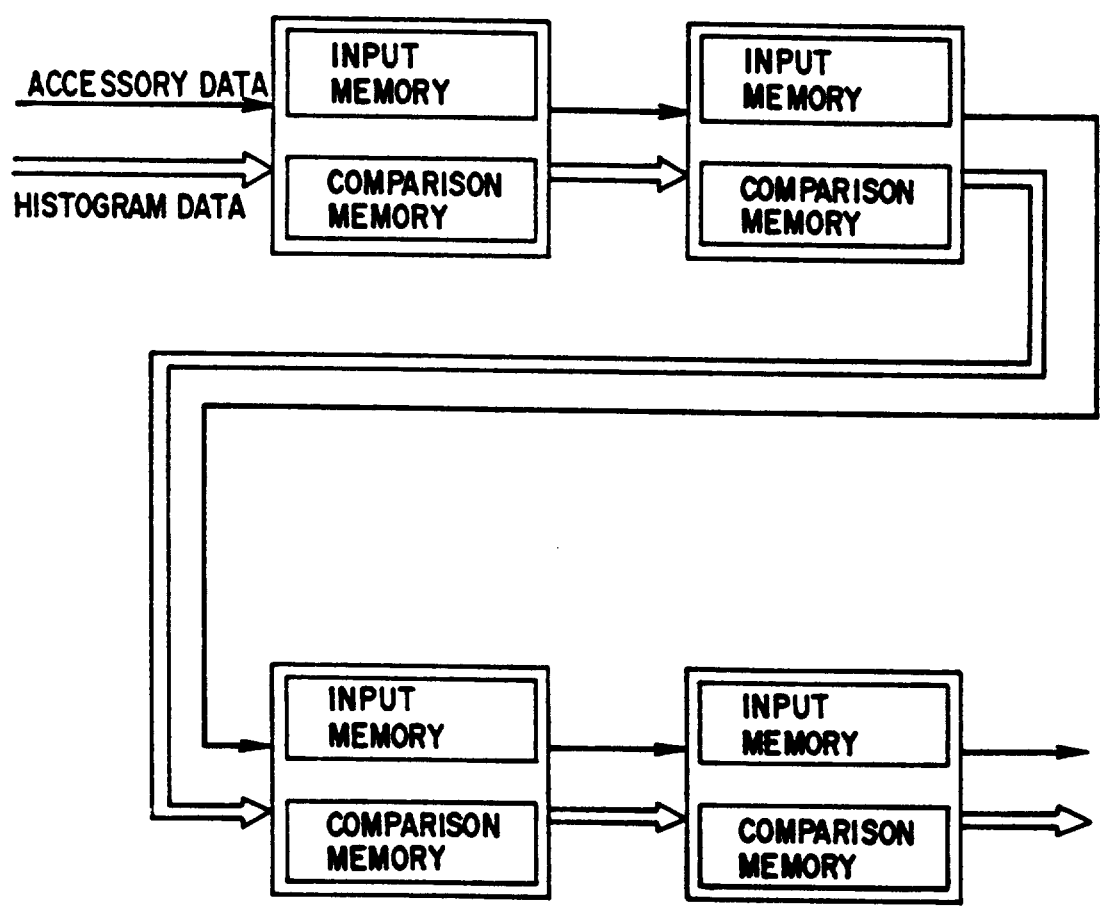
FIG. 22(a) and (b) are block diagrams of the sorting unit.
Figure 22B:
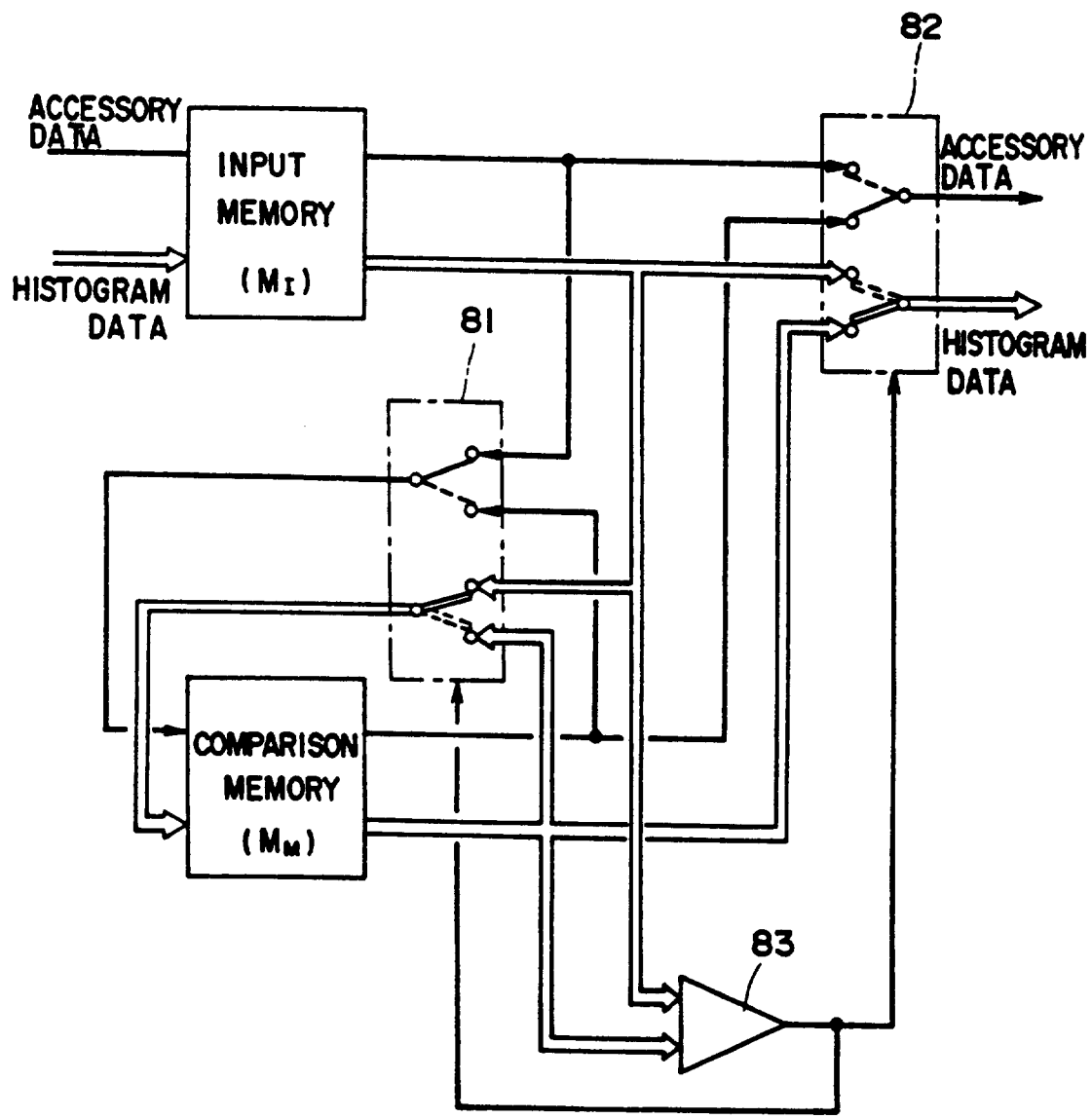

This is shown specifically in FIGS. 22(a) and (b), and FIGS. 23(a)~(d). As shown in FIG. 22(a), four memories $M_{I1} \sim M_{I4}$ as the input memories, and four memories $M_{M1} \sim M_{M4}$ as the comparison memories are provided. The input memories and comparison memories are mated respectively in four stages of circuits. Each stage of circuits, as shown in FIG. 22(b), comprises a pair of the input memory $M_I$ and the comparison memory $M_M$, switching circuits 81, 82, and a comparator 83. When data inputted to the input memory $M_I$ is larger than the data stored by the comparison memory $M_M$, the comparator 83 supplies an output which actuates the switching circuit 81 as indicated by a solid line in FIG. 22(b) and the input data is stored by the comparison memory $M_M$. At the same time, since the switching circuit 82 is in the state as indicated by a solid line, the data stored by the comparison memory $M_M$ is transferred to a next stage. In contrast to this, when input data (to the input memory $M_I$) is smaller than the data stored in the comparison memory $M_M$, the comparator 83 controls the switching circuits 81, 82 to be in the states indicated by dot lines. The input data is transferred directly to a next stage. The content of the comparison memory $M_M$ does not change.

Figures 23A, 23B:
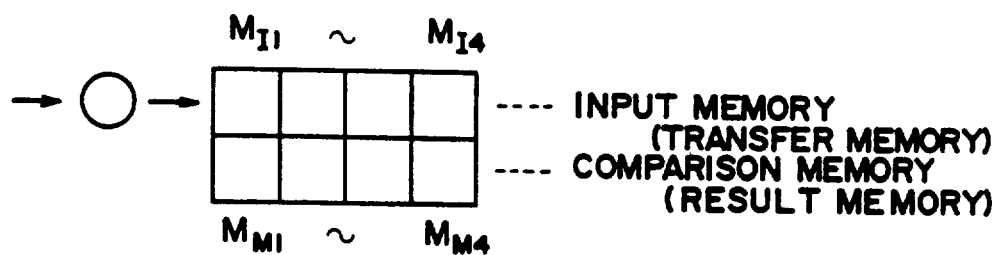
FIGS. 23(a) and (b) are views explaining the sorting.
Figure 23C:
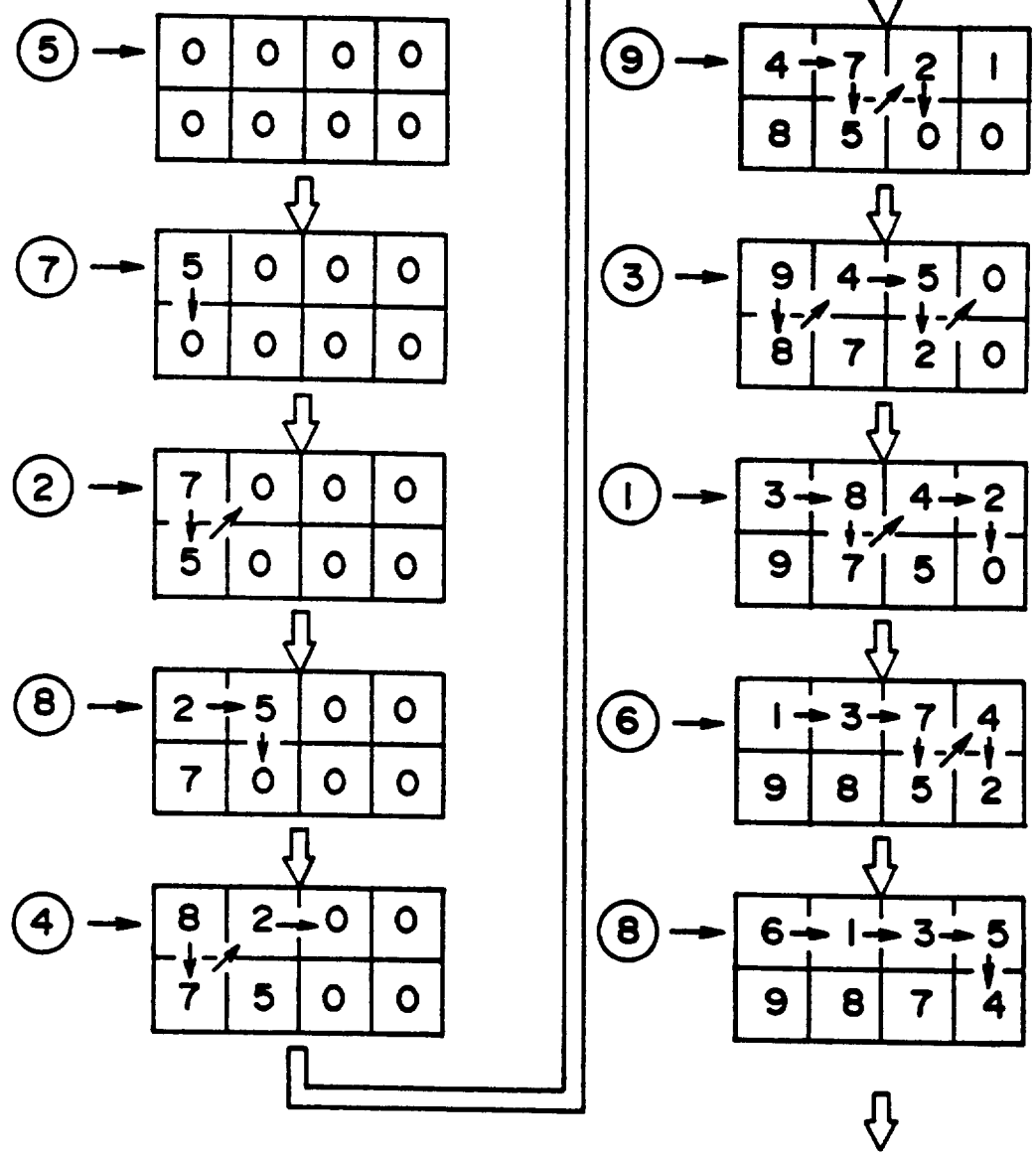
Figure 23D:
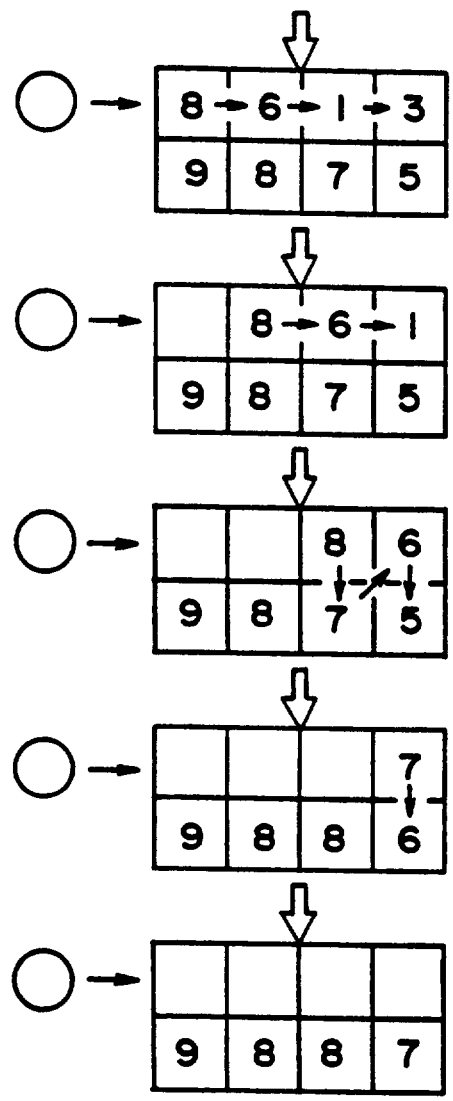

It is assumed that in this sorting unit, the input data are 10, i.e., "5, 7, 2, 8, 4, 9, 3, 1, 6, 8" as shown in FIG. 23(a). Operations following the initialization as in FIG. 23(b) change the data stored in the comparison memories $M_{M1} \sim M_{M4}$ in the sequence indicated by the arrow in FIG. 23(c), and finally the contents

| Comparison memory | $M_{M1} = 9$ |
| Comparison memory | $M_{M2} = 8$ |
| Comparison memory | $M_{M3} = 8$ |

-continued

| Comparison memory | $M_{M4} = 7$ | are stored. This sorting processing may be executed by software. Following a series of the above described processings, the picture processing device according to this invention finishes all the steps of its signal processing. Then an approximate straight line interconnecting the points to be processed on the original picture is given in values of the above described $p,\theta$. The DDA computing unit provided by hardware is inserted before the peak filter of FIG. 20 as the peak data extracting means. The sorting of peak data are performed by the sorting unit provided by hardware of FIG. 22. These continuous processings are performed by the hardware in a pipe line system. Consequently the processing can be speeded up.

Next, the rotary motion recurrence formula computing device will be explained in good detail.

Figure 24:
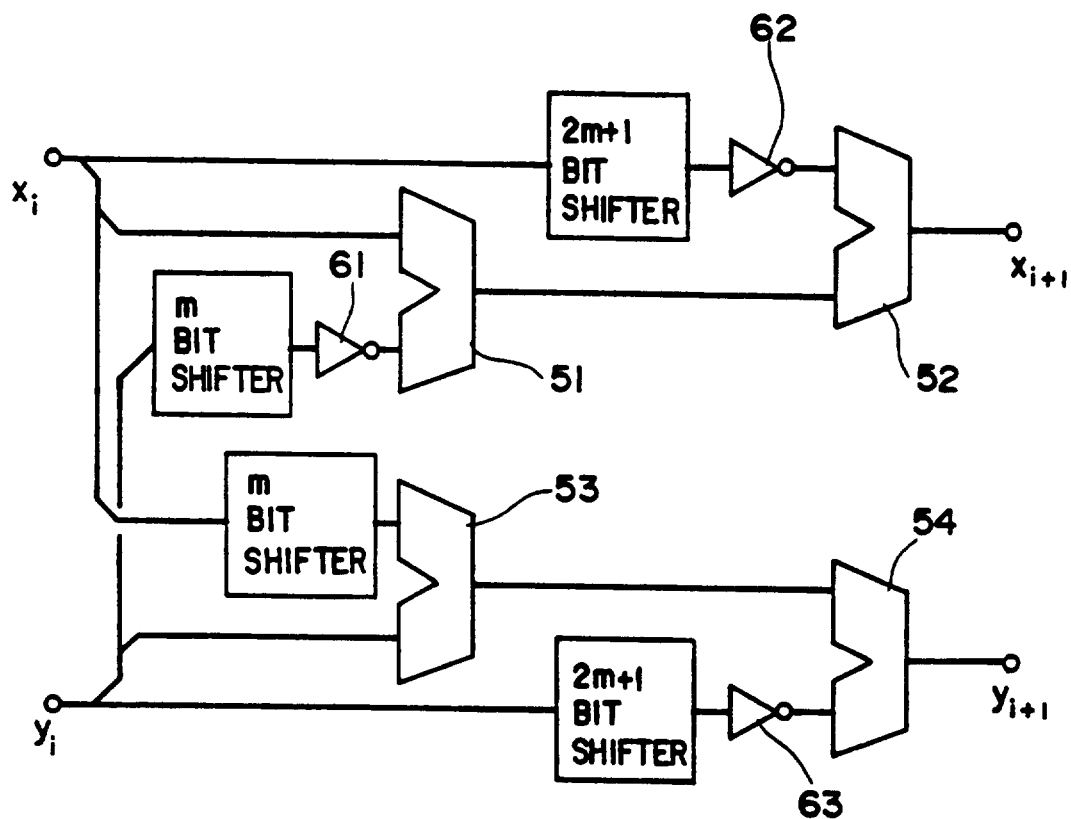
FIG. 24 is a circuit diagram of the computing device according to an embodiment of this invention.

FIG. 24 is a circuit diagram of the computing device according to an embodiment of this invention. As shown in FIG. 24, the first computing means comprises a first inverter 51 for sign inverting coordinate data $y_i$ shifted by m bits, a first adder 51 for adding the coordinate data $x_i$ and an output of the first inverter 61, a second inverter 62 for sign inverting coordinate data $x_i$ shifted by 2m+1 bits, and a second adder 52 for receiving an output of the first adder 51 and an output of the second inverter 62 to output coordinate data $x_{i+1}$. The second computing means comprises a third adder for adding the coordinate data $y_i$ and coordinate data $x_i$ shifted by m bits, a third inverter 63 for sign inverting coordinate data $y_i$ shifted by 2m+1 bits, and a fourth adder for adding an output of the third adder 53 and an output of the third inverter 63.

Figure 7:
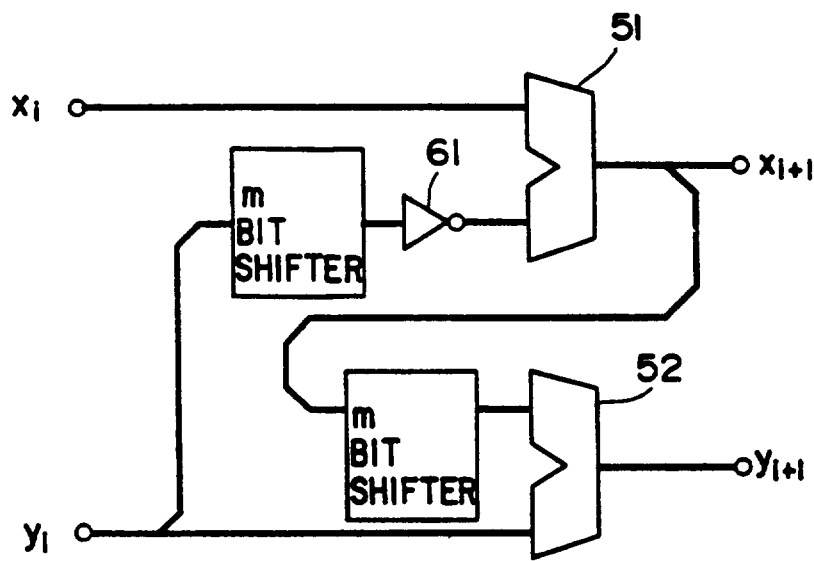
FIG. 7 is a block diagram of a conventional rotary motion recurrence formula computing device.
Figures 8A, 8B:
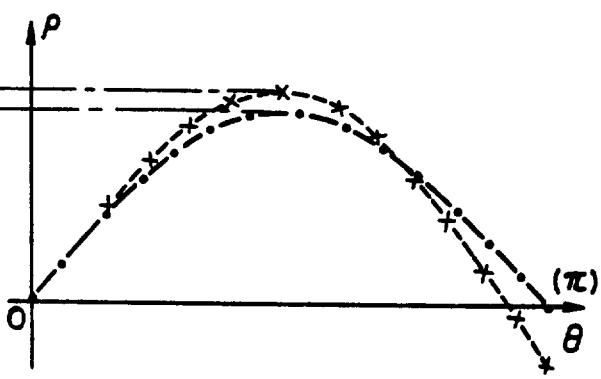
FIG. 8(a) and (b) are views explaining the error generation.

The device shown in FIG. 24 can compute the recurrence formula $$x_{i+1} = (1 - 2^{-2m-1})x_i - 2^{-m}y_i \quad (33)$$

$$y_{i+1} = 2^{-m}x_i + (1 - 2^{-2m-1})y_i \quad (34)$$

to which the second order approximation reduces Formulas 7 and 8. The computing device according to the first embodiment may comprise only two sets of two stage adders, and their associated inverters and can compute the recurrence formula at high speed. That is, since only two adders are passed, even a slowest pass can be computed at substantially the same high speed as in the conventional device of FIG. 7. Furthermore, the error is so small as stated in FIG. 9 that the relative error d' can be kept below 0.4% at the rotation angle $\epsilon = 2^{-4}$.

Figure 25:
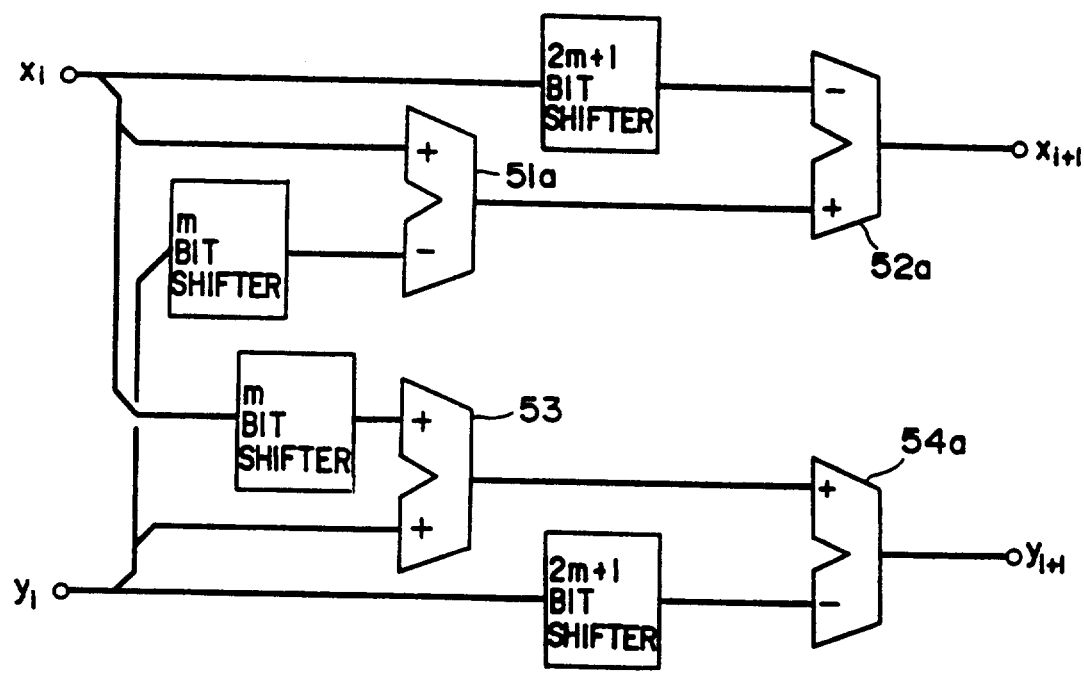
FIGS. 25, 26 and 27 are circuit diagrams of the modification of the device.
Figure 26:
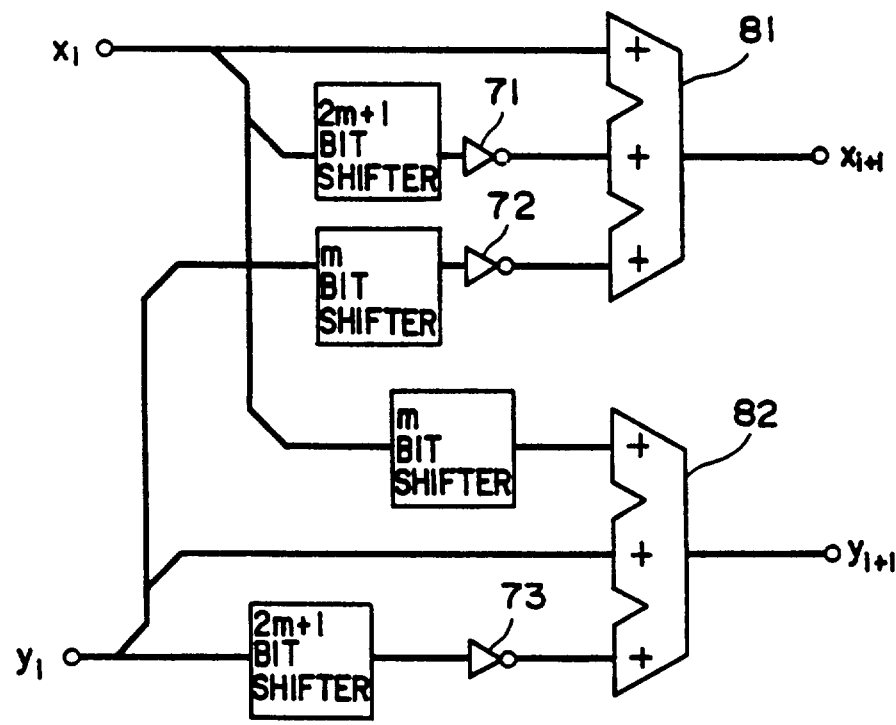

FIGS. 25 and 26 show modifications of the device according to the embodiment. The modification of FIG. 25 is different from the device of FIG. 24 in that in the modification the inverters 61, 62 and 63 are omitted, and the adders 51, 52 and 54 are replaced by subtractors 51a, 52a and 54a. The modification of FIG. 26 has a circuit comprising inverters 71, 72 and 73, and three input adders 81 and 82. The circuit of FIG. 26 can compute the recurrence formula at the same high speed as that of FIG. 24.

Next a second embodiment of this invention will be explained with reference to FIG. 27.

Figure 27:
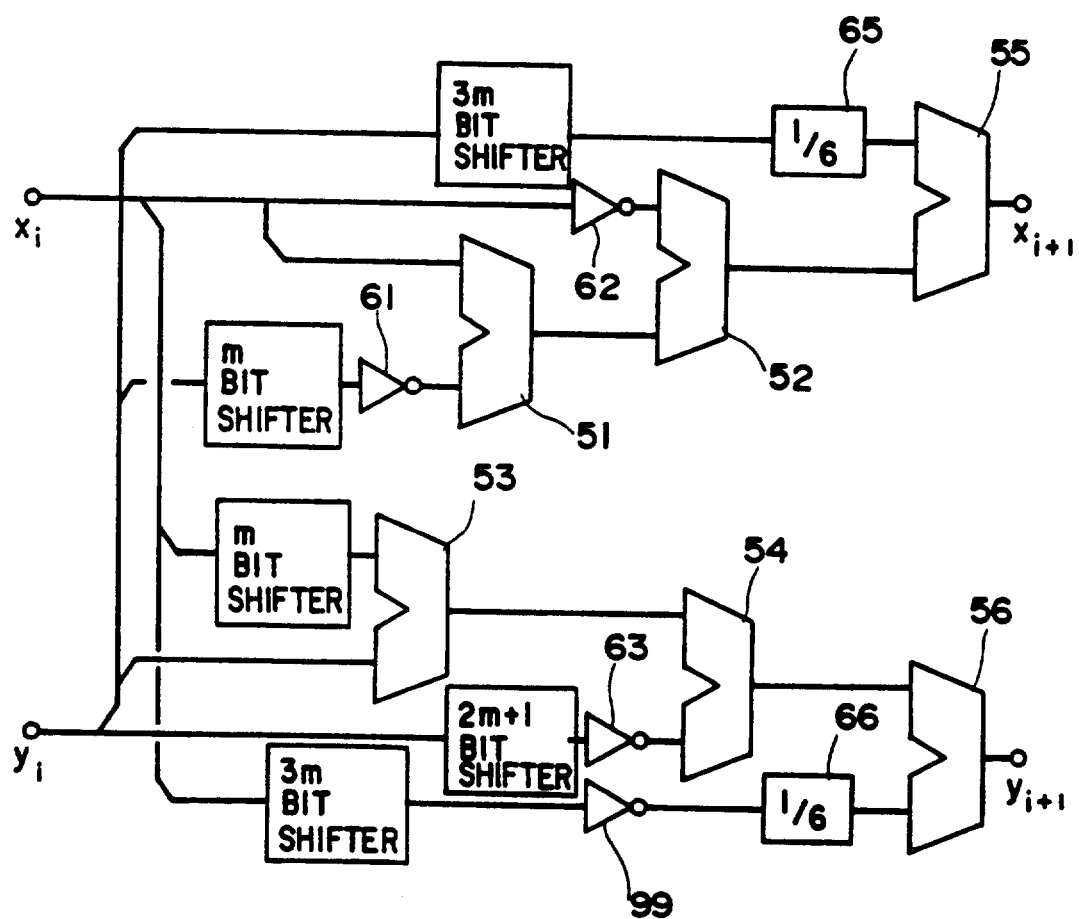

The embodiment of FIG. 27 is different from the embodiment of FIG. 24 and its modifications of FIGS.

25 and 26 in that in the embodiment of FIG. 27 the first computing means additionally includes a first divider 65 for multiplying coordinate data $y_i$ shifted by 3m bits, and a fifth adder 55 for adding an output of the first dividier 65 and an output of the second adder 52, and the second computing means additionally includes a second divider 66 for coordinate data $x_i$ shifted by 3m and sign inverted by an inverter 99 and a sixth adder 56 for adding an output of the second divider 66 and an output of the fourth adder 54.

The computing device according to the second embodiment can compute the recurrence formula $$x_{i+1} = (1 - 2^{-2m-1})x_i + (-2^{-m} + 2^{-3m}/6)y_i \quad (35)$$

$$y_{i+1} = (2^{-m} + 2^{-3m}/6)x_i + (1 - 2^{-2m-1})y_i \quad (36)$$

to which the third order approximation reduces Formulas 7 and 8. The computing device according to the second embodiment comprises two sets of three stage adders, and the dividers. This results in making the device more complicated in comparison with that according to the first embodiment in hardware, and the computation speed accordingly lowers. But the greatly improved computation precision, as stated in FIG. 9, is an advantageous effect of the device according to the second embodiment.

Figure 28:
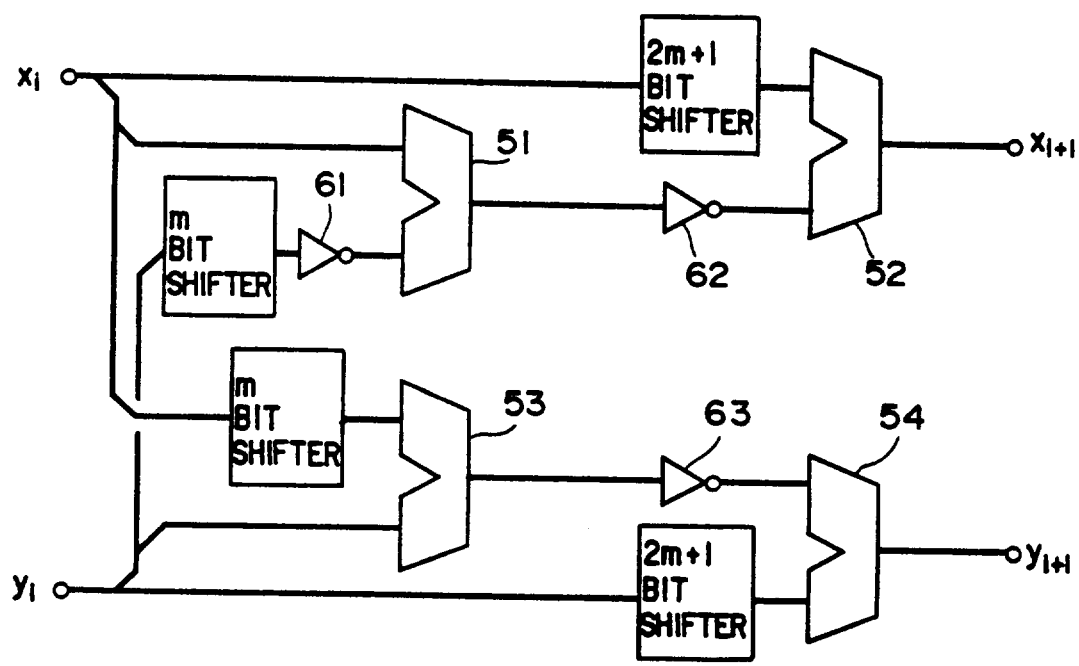
FIGS. 28, 29 and 30 are circuit diagrams of a different example of the embodiment of FIG. 24.

FIG. 28 is a circuit diagram of a different example of the embodiment of FIG. 24. As shown in FIG. 28, the first computing means comprises a first inverter 61 shifting the coordinate data $y_i$ by m bits and inverting the same; a first adder 51 for adding the coordinate data $x_i$, and an output of the first inverter 61; a second inverter 62 for inverting an output of the adder 51; and a second adder for receiving coordinate data shifted by 2m+1 bits, and an output of the second inverter 62 to output coordinate data $x_{i+1}$. The second computing means comprises a third adder 53 for adding the coordinate data $y_i$, and coordinate data $x_i$ shifted by m bits; a third inverter 63 for inverting an output of the third adder 53; and a fourth adder 54 for adding coordinate data shifted by 2m+1 bits, and an output of the third inverter 63.

The device of FIG. 28 can compute Rotary Motion Recurrence Formulas 33 and 34.

Figure 29:
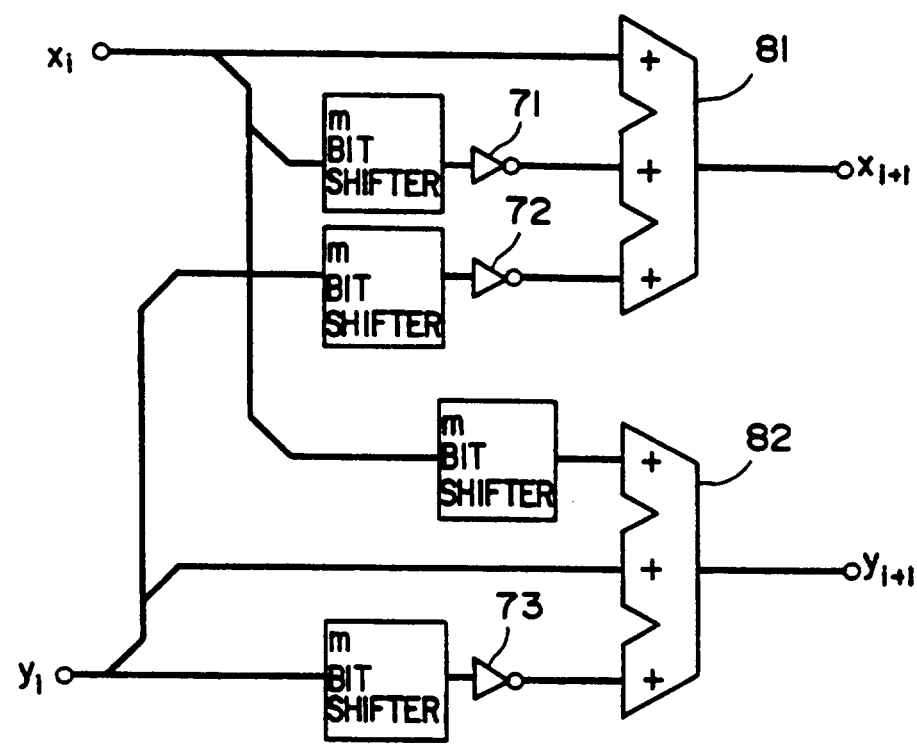

FIG. 29 shows another different example of the embodiment of FIG. 24. The device of FIG. 29 has a circuit comprising inverters 71, 72, 73, and three input adders 81, 82. This circuit can compute Formulas 13 and 14, as the circuit of FIG. 28 can.

Figure 30:
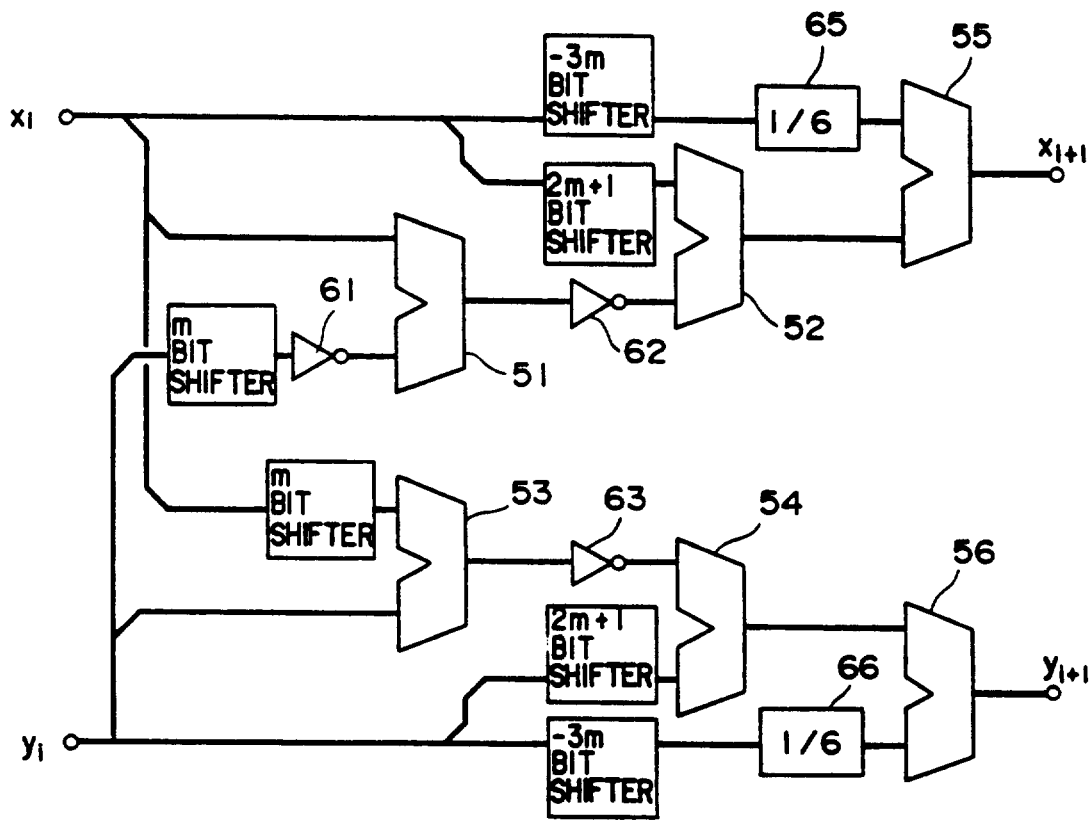

Referring to FIG. 30, examples of the embodiment of FIG. 27 will be explained.

This example is different from that of FIG. 29 in that in the former the first computing means additionally includes a first divider 65 for multiplying by 1/6 coordinate data $y_i$ shifted by 3m bits, and a fifth adder for adding an output of the first divider 65, and an output of the second adder 52, and the second computing means additionally includes a second divider 66 for multiplying 1/6 coordinate data $x_i$ shifted by 3m bits and inverted by the inverter 63; and a sixth adder 56 for adding an output of the second divider 66, and an output of the fourth adder 54.

This example can compute the Rotary Motion Recurrence Formulas 35 and 36.

This invention is not limited to the above described embodiment but covers various modifications.

In obtaining histograms at the points of intersection of Hough curves, in place of the brightness value data based on brightness change ratios (value of differentiated edged data), two valued data may be multiplexed so that the histogram is based on density of points of intersection. Instead of preparing the edged data by differentiation, data corresponding to the brightness may be digitally processed as brightness data, and then histograms may be obtained at points of intersection of Hough curves.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. A peak data extracting device for extracting a number of relative peak value data from data corresponding to respective coordinates in at least a two dimensional coordinate system having a first set of coordinates containing a first coordinate value to an n th coordinate value (n: 3 or an integer larger than 3) and a second set of coordinates containing a first coordinate value to an m th coordinate value (m: 3 or an integer larger than 3), the device comprising:

buffer means for temporarily storing data corresponding to nine coordinates comprising an i−1 th, an i th, and an i+1 th coordinate (i: $0 \leq i \leq n-1$) belonging to the first set of coordinates, and a j th, a j−1 th, and a j+1 th coordinate (j: $0 \leq j \leq m-1$) belonging to the second set of coordinates;

comparing means for comparing data corresponding to the i th coordinate of the first set of coordinates and the j th coordinate of the second set of coordinates with data corresponding to the other eight coordinates;

outputting means for outputting the data corresponding to the i th coordinate of the first set of coordinates and the j th coordinate of the second set of coordinates as peak data when the comparing means judges the data to be maximum values; and a sorting means which receives the outputted data representing maximum values from the outputting means and arranges the outputted data in order of magnitude, the sorting means comprising a plurality of stages of sort circuits, the sort circuit of each stage including a pair of an input memory and a comparison memory for storing the peak data and its corresponding coordinates, the sort circuit of each stage transferring the peak data and corresponding coordinates of one input memory to its paired comparison memory and transferring the content of the paired comparison memory to an input memory of a next stage of the sort circuit, when peak data of the input memory is larger than that of the paired comparison memory, and the sort circuit transferring the content of an input memory of one stage to an input memory of a next stage of the sort circuit, when peak data of the input memory of the sort circuit of each stage is smaller than that of the paired comparison memory.

2. A peak data extracting device according to claim 1, wherein the sort circuit of each stage includes a comparator for comparing the peak data stored in the paired input memory with that stored in the paired comparison memory; and switching means for switching the transfer of the peak data and the corresponding coordinate values in accordance with an output of the comparator.

3. A peak data extracting device comprising:

computing means for executing Hough transform on respective plural points to be processed in a first two dimensional coordinate system to give Hough curves in a second two dimensional coordinate system, and outputting data of a histogram of intersections of the Hough curves in correspondence with the coordinates of the intersections;

extracting means for extracting peak data from data corresponding to respective coordinates in at least a two dimensional coordinate system having a first set of coordinates containing a first coordinate value to an n th coordinate value (n: 3 or an integer larger than 3) and a second set of coordinates containing a first coordinate value to an m th coordinate value (m: 3 or an integer larger than 3); and a sorting means which receives the outputted data representing maximum values from the outputting means and arranges the outputted data in order of magnitude, the sorting means comprising a plurality of stages of sort circuits, the sort circuit of each stage including a pair of an input memory and a comparison memory for storing the peak data and its corresponding coordinates, the sort circuit of each stage transferring the peak data and corresponding coordinates of one input memory to its paired comparison memory and transferring the content of the paired comparison memory to an input memory of a next stage of the sort circuit, when peak data of the input memory is larger than that of the paired comparison memory, and the sort circuit transferring the content of an input memory of one stage to an input memory of a next stage of the sort circuit, when peak data of the input memory of the sort circuit of each stage is smaller than that of the paired comparison memory.

4. The peak data extracting device of claim 3 wherein the extracting means comprises:

buffer means for temporarily storing data corresponding to nine coordinates comprising an $i-1$ th, an i th, and an $i+1$ th coordinate (i: $0 \leq j \leq n-1$) belonging to the first set of coordinates, and a j th, a $j-1$ th, and a $j+1$ th coordinate (j: $0 \leq j \leq m-1$) belonging to the second set of coordinates;

comparing means for comparing data corresponding to the i th coordinate of the first set of coordinates and the j th coordinate of the second set of coordinates with data corresponding to the other eight coordinates; and outputting means for outputting the data corresponding to the i th coordinate of the first set of coordinates and the j th coordinate of the second set of coordinates as peak data when the comparing means judges the data to be maximum values.

5. A peak data extracting device according to claim 4, wherein the sort circuit of each stage includes a comparator for comparing the peak data stored in the paired input memory with that stored in the paired comparison memory; and switching means for switching the transfer of the peak data and the corresponding coordinate values in accordance with an output of the comparator.

6. A peak data extraction device for extracting and storing relative peak data values from an array of data having different magnitudes and being located by a set of coordinates of at least a two dimensional coordinate system, the device comprising:

comparing means for comparing each data value in the array to eight surrounding data values;

outputting means for outputting a data value and its corresponding coordinates when the magnitude of the data value exceeds the magnitude of the eight surrounding data values, said outputted data value comprising a relative peak data value; and sorting means for receiving and storing outputted data values from the outputting means and sorting the outputted data values in order of magnitude, the sorting means comprising a plurality of stages of sort circuits, the sort circuit of each stage being capable of comparing a pair of outputted data values and passing the data value having a lesser magnitude and its corresponding coordinates to the sort circuit of the next stage.

* * * * *